United States Patent
Hodgson et al.

(10) Patent No.: US 9,132,614 B2
(45) Date of Patent: Sep. 15, 2015

(54) REINFORCED COMPOSITE MATERIALS FOR USE IN THE MANUFACTURE MOULDS AND THE USE OF SUCH MOULDS

(75) Inventors: Peter Hodgson, Speers Point (AU); Richard Bystrzynski, Merrylands (AU)

(73) Assignee: MIRTEQ PTY LIMITED, Warabrook, NSW (AU)

( * ) Notice: Subject to any disclaimer, the term of this patent is extended or adjusted under 35 U.S.C. 154(b) by 123 days.

(21) Appl. No.: 13/699,199

(22) PCT Filed: May 26, 2011

(86) PCT No.: PCT/AU2011/000637
§ 371 (c)(1),
(2), (4) Date: Feb. 4, 2013

(87) PCT Pub. No.: WO2011/146995
PCT Pub. Date: Dec. 1, 2011

(65) Prior Publication Data
US 2013/0130016 A1    May 23, 2013

(30) Foreign Application Priority Data

May 26, 2010  (AU) ................................ 2010902306

(51) Int. Cl.
| C08J 9/00 | (2006.01) |
| B32B 27/18 | (2006.01) |
| B29C 33/38 | (2006.01) |
| B29C 33/40 | (2006.01) |
| B32B 5/24 | (2006.01) |
| B32B 5/26 | (2006.01) |

(Continued)

(52) U.S. Cl.
CPC ............. B32B 27/18 (2013.01); B29C 33/3842 (2013.01); B29C 33/40 (2013.01); B32B 5/18 (2013.01); B32B 5/245 (2013.01); B32B 5/26 (2013.01); B32B 37/14 (2013.01); *B29K 2105/12* (2013.01); *B29L 2031/757* (2013.01); *B32B 2260/021* (2013.01); *B32B 2260/023* (2013.01); *B32B 2260/046* (2013.01); *Y10T 156/10* (2015.01); *Y10T 428/249986* (2015.04)

(58) Field of Classification Search
CPC .. B29C 44/1266; B29C 33/40; B29C 33/3842
USPC ................................. 264/219, 45.3
See application file for complete search history.

(56) References Cited

U.S. PATENT DOCUMENTS 2,674,548 A    4/1954  Balz
3,081,195 A    3/1963  Biefeld et al.
(Continued)

FOREIGN PATENT DOCUMENTS

JP    57-055931    4/1982
JP    03-249274    11/1991
(Continued)

OTHER PUBLICATIONS

International Search Report dated Aug. 17, 2011 for corresponding PCT/AU2011/000637.

*Primary Examiner* — Galen Hauth
(74) *Attorney, Agent, or Firm* — Jones Day

(57) ABSTRACT

The present disclosure relates to the preparation of composite molds and methods of preparing the same, wherein the composite molds may be prepared exclusive or inclusive of a plug. Certain composites comprise a substrate, a structural laminate, and a syntactic foam molding product.

20 Claims, 8 Drawing Sheets

(51) Int. Cl.
  *B32B 5/18* (2006.01)
  *B32B 37/14* (2006.01)
  *B29K 105/12* (2006.01)
  *B29L 31/00* (2006.01)

(56) References Cited

U.S. PATENT DOCUMENTS

| | | | |
|---|---|---|---|
| 3,398,210 A | 8/1968 | Plueddemann et al. | |
| 3,471,439 A | 10/1969 | Bixler et al. | |
| 3,649,320 A | 3/1972 | Yates | |
| 3,928,684 A | 12/1975 | Buning | |
| 4,038,243 A | 7/1977 | Maaghul | |
| 4,158,714 A | 6/1979 | Brichta et al. | |
| 4,165,307 A | 8/1979 | Mizuno et al. | |
| 4,196,106 A | 4/1980 | Matsuura et al. | |
| 4,247,436 A | 1/1981 | Buning et al. | |
| 4,370,169 A | 1/1983 | Graham | |
| 4,374,177 A | 2/1983 | Hsu et al. | |
| 4,405,727 A | 9/1983 | Brownscombe | |
| 4,457,970 A | 7/1984 | Das et al. | |
| 4,465,797 A | 8/1984 | Brownscombe et al. | |
| 4,524,040 A | 6/1985 | Hergenrother | |
| 4,536,360 A | 8/1985 | Rahrig | |
| 4,536,447 A | 8/1985 | Hsu | |
| 4,560,523 A | 12/1985 | Plumley et al. | |
| 4,595,623 A * | 6/1986 | Du Pont et al. | 428/195.1 |
| 4,601,867 A * | 7/1986 | Martell et al. | 264/227 |
| 4,740,538 A | 4/1988 | Sekutowski | |
| 4,789,593 A | 12/1988 | Das | |
| 4,801,627 A | 1/1989 | Rahrig et al. | |
| 5,075,351 A | 12/1991 | Joslyn et al. | |
| 5,085,938 A | 2/1992 | Watkins | |
| 5,086,101 A | 2/1992 | Garrett et al. | |
| 5,130,194 A | 7/1992 | Baker | |
| 5,234,997 A | 8/1993 | Oda et al. | |
| 5,525,180 A | 6/1996 | Paul et al. | |
| 5,538,784 A | 7/1996 | Subramanian | |
| 5,948,503 A | 9/1999 | Yamamoto et al. | |
| 5,968,641 A | 10/1999 | Lewis | |
| 6,025,073 A | 2/2000 | Piret | |
| 2005/0266219 A1 | 12/2005 | Hodgson | |
| 2008/0286572 A1 | 11/2008 | Hodgson | |
| 2010/0120968 A1 | 5/2010 | Hodgson | |
| 2013/0130016 A1 | 5/2013 | Hodgson et al. | |

FOREIGN PATENT DOCUMENTS

| | | |
|---|---|---|
| JP | 2001172865 | 6/2001 |
| WO | WO 99/44955 | 9/1999 |
| WO | WO 01/68752 | 9/2001 |
| WO | WO 02/40577 | 5/2002 |

\* cited by examiner

REINFORCED COMPOSITE MATERIALS FOR USE IN THE MANUFACTURE MOULDS AND THE USE OF SUCH MOULDS

CROSS-REFERENCE TO RELATED APPLICATIONS

This application is the National Phase application of International Application No. PCT/AU2011/000637, filed May 26, 2011, which designates the United States and was published in English, and further claims the benefit of Australian provisional patent application No. 2010902306 entitled "Reinforced Composite Material for use in the Manufacture of Direct to Mould CNC Machined Tooling for the Thermoset Composites Moulding Industry" filed May 26, 2010. The foregoing related applications, in their entirety, are incorporated herein by reference. In addition, the entire content of each of the following applications is hereby incorporated by reference: International Application PCT/AU2006/001536, filed 17 Oct. 2006; Australian Provisional Application Nos. 2005905733, filed 17 Oct. 2005; 2005906723, filed 1 Dec. 2005; 2006900511, filed 3 Feb. 2006 and 2006902791, filed 24 May 2006, International Application PCT/AU2008/000276, filed 29 Feb. 2008; Australian Provisional Application No. 2007901075, filed 2 Mar. 2007; and U.S. patent application Ser. No. 12/529,624, filed 29 Feb. 2008 and published as 20100120968 on May 13, 2010.

FIELD

The present disclosure relates to reinforced composite materials, and in particular to a combination of fibre filled and syntactic foam filled reinforced polymer composites. However, it will be appreciated that the disclosure is not limited to this particular field of use.

BACKGROUND

Fibre reinforced and syntactic foam filled polymer composites are known in the art and are commonly made by reacting a curable resin with a reactive diluent in the presence of a free radical initiator. Reinforcing materials such as glass fibre and functional fillers are also included in the formulations to provide dimensional stability and toughness. Typically, the curable resin is an unsaturated polyester resin and the reactive diluent is a vinyl monomer. However, other thermoset resins may be used, such as acrylic, vinyl ester resins, urethane or epoxy resins. Such reinforced composites are used in many applications, including mould making, architectural construction, automotive, aerospace, marine and for corrosion resistant products.

With the advent of CNC machining practices a growing number of mould manufacturers are turning to CNC processes to manufacture tooling plugs. Plugs generally are three dimensional templates from which composites moulds are fabricated. The plug may be an accurate and sturdy reproduction of the part to be moulded.

A typical historical process is as follows:

A block of rigid machineable foam or other substrate is placed under a CNC router or in a CNC workstation and is machined roughly to the shape of the part intended to be moulded. The block may be machined undersized so that a curable, machineable moulding compound can be applied at an overall thickness larger than the part and also thick enough to be structurally sound so that a mould of the machined shape can be made. In the industry this machined part from which the mould will be made is typically called a plug.

Moulding compounds currently in the market that are used to coat foam or wooden substrates are not always strong or durable enough in themselves to be used to create production moulds in their own right. Also, the composition of available moulding compounds is such that they tend to entrap air, and they leave voids that are exposed during machining of the final shape. These voids have to be hand filled and the filled surface hand shaped, which is labour intensive and usually difficult to perform.

The substrate that is often cheapest, lightest and easiest to machine is rigid foam. Two common foams in use are urethane and polystyrene foams. Urethane foam has the advantage of being solvent resistant but it is more expensive than polystyrene foam, especially in block form. Polystyrene foam, however, has at least one drawback in that the polystyrene foam is soluble in low molecular weight vinyl functional diluents, which may be overcome in some situations by adding a sealer to isolate the polystyrene foam from the effects of the low molecular weight diluents found in unsaturated polyester and vinyl ester resins, the resin system often used for making fibreglass plugs and moulds.

However, there are one or more shortcomings in the current art, for example:
a) The foam substrate needs to be laminated with fibreglass, which requires multiple material applications and preparations and hand consolidation.
b) Moulding compounds are usually not durable enough to be used as moulds in their own right and/or may have varying degrees of porosity.
c) Moulding compounds, due to the morphology are laid up with voids that require manual consolidation.
d) Direct to mould compounds are not resilient enough to handle higher volume production runs.
e) Existing methods of manufacture are costly in time, labour and/or cost of materials used.

The present disclosure is directed, in part, to certain embodiments to overcome and/or ameliorate one or more of these disadvantages and/or to provide one or more useful alternatives and/or one or more additional advantages. Other advantages and/or benefits will become apparent from the discussion herein.

SUMMARY

In certain embodiments, a method for producing a composite mould, comprising: i) forming a substrate; ii) applying a fibre reinforced structural laminate to the substrate; iii) applying a syntactic foam moulding product to the fibre reinforced structural laminate, wherein said syntactic foam moulding product comprises: a) a plurality of treated reinforcing microfibres; b) a curable resin mixture, comprising a curable resin and optionally thixatropes and plastic spheres/hemispheres; and c) a coupling agent; iv) optionally applying a tooling gel coat to the surface of said syntactic foam moulding product for the manufacture of moulds that require a high gloss surface finish; and v) curing said composite mould; wherein: i) optionally applying a foam sealer product to the substrate prior to applying the structural laminate; and ii) the method of producing the composite mould is inclusive or exclusive of making and/or using a plug or composite plug.

In certain embodiments, a method for producing a composite mould, comprising: i) forming a substrate; ii) applying a fibre reinforced structural laminate to the substrate, wherein said fibre reinforced structural laminate comprises: a) a first plurality of reinforcing fibres; and b) a first curable resin mixture, comprising a first curable resin and optionally a wetting agent; iii) applying a syntactic foam moulding product to the fibre reinforced structural laminate, wherein said syntactic foam moulding product comprises: a) a plurality of treated reinforcing microfibres; b) a second curable resin mixture, comprising a second curable resin, thixatropes, and plastic spheres/hemispheres; and c) a coupling agent; iv) optionally applying a tooling gel coat to the surface of said syntactic foam moulding product for the manufacture of moulds that require a high gloss surface finish; and v) curing said composite mould; wherein: i) optionally applying a foam sealer product to the substrate prior to applying the structural laminate, wherein the optional foam sealer product comprises: a) a plurality of treated reinforcing microfibres and/or Mica flakes; b) a foam sealer; and c) a coupling agent; and ii) the method of producing the composite mould is inclusive or exclusive of making and/or using a plug or composite plug.

In certain embodiments, a method for producing a composite mould, comprising: i) forming a substrate; ii) applying a fibre reinforced structural laminate to the substrate, wherein: a) the fibre reinforced structural laminate requires less mechanical consolidation during application to the surface of said substrate as compared with traditional plug or composite plug composite mould methods, or substantially no mechanical consolidation during application to the surface of said substrate; and b) said fibre reinforced structural laminate is prepared by contacting a first plurality of reinforcing fibres with a first curable resin mixture, wherein said first curable resin mixture comprises a first curable resin and optionally a predetermined quantity of a wetting agent; iii) applying a syntactic foam moulding product to the fibre reinforced structural laminate to add rigidity and provide a durable, and machineable moulding surface for the production of composite parts to the surface of said fibre reinforced structural laminate, wherein said syntactic foam moulding product is prepared by combining: a) a plurality of treated reinforcing microfibres; b) a second curable resin mixture, comprising a second curable resin, thixatropes, and plastic spheres/hemispheres; and c) a predetermined quantity of coupling agent; iv) optionally applying a tooling gel coat to the surface of said syntactic foam moulding product for the manufacture of moulds that require a high gloss surface finish; and v) curing said composite mould; wherein: i) optionally applying a foam sealer product to the substrate prior to applying the structural laminate, wherein the optional foam sealer product comprises: a) a plurality of treated reinforcing microfibres and/or Mica flakes; b) a foam sealer; and c) a coupling agent; and ii) the method of producing the composite mould is inclusive or exclusive of making and/or using a plug or composite plug.

In certain embodiments, the applied fibre reinforced structural laminate requires less mechanical consolidation during application to the surface of said substrate as compared with traditional plug, or composite plug, composite mould methods.

In certain embodiments, the applied fibre reinforced structural laminate requires substantially no mechanical consolidation during application to the surface of said substrate.

In certain embodiments, the syntactic foam moulding product adds rigidity and provides a durable, and machineable moulding surface for the production of composite parts.

In certain embodiments, the syntactic foam moulding product is sprayable and/or machineable.

In certain embodiments, the fibre reinforced structural laminate is further machined or touched up after being applied to the surface of said substrate.

In certain embodiments, the syntactic foam moulding product is further machined or touched up after being applied to the surface of said fibre reinforced structural laminate.

In certain embodiments, the time required to produce the composite mould is reduced by at least 30%, 40%, 50%, 60% or 70% as compared with as compared with traditional plug or composite plug composite mould methods.

In certain embodiments, the materials required to produce the composite mould is reduced by at least 30%, 40%, 50%, 60% or 70% as compared with as compared with traditional plug or composite plug composite mould methods.

In certain embodiments, the cost required to produce the composite mould is reduced by at least 30%, 40%, 50%, 60% or 70% as compared with as compared with traditional plug or composite plug composite mould methods.

In certain embodiments, the time required to produce the composite mould is reduced by at least 30%, 40%, 50%, 60% or 70% as compared with as compared with traditional plug or composite plug composite mould methods; and the materials required to produce the composite mould is reduced by at least 30%, 40%, 50%, 60% or 70% as compared with as compared with traditional plug or composite plug composite mould methods.

In certain embodiments, the substrate comprises: i) a structural substrate, comprising: a solid substrate; a wooden substrate; a plywood substrate; a particle board substrate; a MDF substrate; a composite material; a structural fibre board; a polymer concrete substrate; a concrete substrate; a fibreglass substrate; a polymer composite substrate; or a plastic composite substrate; ii) a non-structural substrate, comprising: a foam substrate; a plastic foam, meshing, or fabric; a sealed polystyrene foam substrate; a polyurethane foam substrate; or a rigid plastic foam substrate; iii) a machined substrate, a CNC machined substrate, a fabricated substrate, and/or a sealed substrate; and/or iv) combinations thereof.

In certain embodiments, the substrate is sealed with a foam sealer product.

In certain embodiments, the foam sealer comprises: i) a sprayable/rollable water based sealer formulated from polyvinyl alcohol; ii) a sealer made from a low viscosity sprayable/rollable epoxy compound that when cured allows unsaturated polyester or vinyl ester resins to adhere to its surface; or iii) a specially formulated vinyl functional resin that does not attack the polystyrene foam surface such as CCP Styroguard or equivalent.

In certain embodiments, the plurality of treated reinforcing microfibres comprise: i) mineral fibres, comprising wollastonite and/or Mica; ii) glass fibres, comprising E-, S-, or C-class glass; iii) aramid fibres; iv) ceramic fibres; v) cellulose fibres; and/or vi) carbon fibres.

In certain embodiments, the plurality of treated reinforcing microfibres are coated with a coupling agent.

In certain embodiments, the coupling agent comprises a plurality of molecules, each having: i) a first end adapted to bond to a fibre of the plurality of reinforcing fibres; and ii) a second end adapted to bond to the resin when cured.

In certain embodiments, the method is a direct-to-mould method.

In certain embodiments, a moulded composite capable of producing 20 to 1000 parts, wherein the moulded composited is manufactured according to any of the methods described herein.

In certain embodiments, the moulded composite is capable of producing 15 to 1500, 30 to 100, 20 to 50, 100 to 500, 200 to 1000 300 to 800, 400 to 1000 or 500 to 1000 parts, wherein the moulded composited is manufactured according to any of the methods described herein.

In certain embodiments, the moulded composite is capable of producing parts, without the need to retouch the moulded composited wherein the moulded composite is manufactured according to any of the methods described herein.

In certain embodiments, the moulded composite is capable of producing parts, with retouching of the moulded composited wherein the moulded composite is manufactured according any of the methods described herein.

In certain embodiments, a syntactic foam moulding product, comprising: i) a plurality of treated reinforcing microfibres; ii) a curable resin mixture, comprising a curable resin, and optionally thixatropes and plastic spheres/hemispheres; and iii) a coupling agent.

In certain embodiments, the plurality of treated reinforcing microfibres comprise microfibres having an average fibre diameter in the range of between 5-15 microns.

In certain embodiments, the plurality of treated reinforcing microfibres comprise microfibres having a mean fibre length in the range of between 250-800 microns.

In certain embodiments, the plurality of treated reinforcing microfibres comprise microfibres having an aspect ratio of the fibre length to the fibre diameter in the range of between 50:1 to 10:1.

In certain embodiments, the plurality of treated reinforcing microfibres comprise mineral fibres and/or glass fibres, comprising E-, S- or C-class glass.

In certain embodiments, the plurality of treated reinforcing microfibres have been treated, coated and/or modified with a coupling agent such that the properties of an interphase is substantially equivalent to those of the bulk cured resin, wherein the cured resin adjacent to said reinforcing microfibres defines an interphase.

In certain embodiments, the coupling agent comprises a plurality of molecules, each having a first end adapted to bond to the glass fibre and a second end adapted to bond to the resin when cured.

Certain embodiments are direct to the Sprayable Syntactic Foam Moulding Layer, which is sturdy enough to make the mould directly without needing to manufacture a plug. These moulds are capable of being used to pull from 20 to 1000—depending on the shape and complexity of the moulded part. Other ranges of the number of pulls of parts are also contemplated.

Certain embodiments are direct to other Sprayable Syntactic Foam Moulding Layer compositions, which are sturdy enough to make the mould directly without needing to manufacture a plug. These moulds are capable of being used to pull from 20 to 1000—depending on the shape and complexity of the moulded part. Other ranges of the number of pulls of parts are also contemplated.

Certain embodiments may be for use in architectural or designer products and for use in composite mould manufacturing.

Certain embodiments of the present disclosure may be useful in a variety of industries, including amongst others: composite fabrication, architectural features, construction, automotive, aerospace, marine and for corrosion resistant products.

Certain embodiments provide reinforced composite materials wherein a one step, mould fabricating process obviates the need to fabricate a plug prior to making the mould.

Certain embodiments, provide a reinforced composite material that requires reduced or no mechanical consolidation during application as compared to traditional prior art fibreglass reinforced composite materials. Certain embodiments, provide a reinforced composite material that requires reduced or substantial minimal mechanical consolidation during application as compared to traditional prior art fibreglass reinforced composite materials. Furthermore, certain embodiments of the present disclosure retains and/or improves mechanical properties, such as strength and toughness, chemical properties, aesthetic properties such as surface finish or combinations thereof. Further still, since little or no mechanical consolidation is now required for certain embodiments the layers that incorporate chopped fibres a 30 to 40% a reduction in VOC (Volatile Organic Compounds) emissions may also be achieved. This also makes coating the substrate a much easier and faster operation.

Although the disclosure has been described with reference to specific examples, it will be appreciated by those skilled in the art that the disclosure may be embodied in many other forms and/or combinations of features disclosed.

BRIEF DESCRIPTION OF THE FIGURES

The accompanying drawings facilitate an understanding of the various embodiments of this technology.

DETAILED DESCRIPTION

Figure 1:
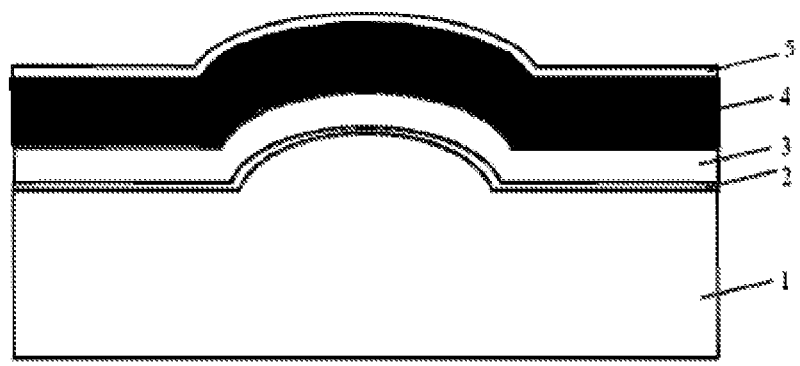
FIG. 1: shows in cross section a diagram highlighting the layers that together form the basis of the direct to mould system according to certain embodiments. The layers that are illustrated in the composite include: (1) a substrate, (2) a sealer (optional), (3) a structural layer, (4) a syntactic foam moulding product, and (5) a tooling gel coat (optional).

The following description is provided in relation to several embodiments that may share common characteristics and features. It is to be understood that one or more features of any one embodiment may be combinable with one or more features of the other embodiments. In addition, any single feature or combination of features in any of the embodiments may constitute additional embodiments.

The subject headings used in the detailed description are included only for the ease of reference of the reader and should not be used to limit the subject matter found throughout the disclosure or the claims. The subject headings should not be used in construing the scope of the claims or the claim limitations.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Other than in the examples, or where otherwise indicated, the numbers expressing quantities of ingredients and/or reaction conditions used herein are to be understood as modified by the term "about". The examples are not intended to limit the scope of the disclosure.

In what follows, or where otherwise indicated, "%" will mean "weight %", "ratio" will mean "weight ratio" and "parts" will mean "weight parts".

The terms "treated reinforcing microfibre" and "treated reinforcing microfibres" as used herein refer to reinforcing microfibres that have been treated, coated and/or modified, for example with a coupling agent, such that the properties of the interphase are substantially equivalent to those of the bulk cured resin, wherein the cured resin adjacent to said reinforcing microfibres defines an interphase. In certain embodiments, a preferred coupling agent comprises a plurality of molecules, each having a first end adapted to bond to the glass fibre and a second end adapted to bond to the resin when cured.

The term "traditional reinforcing fibre composite" and "traditional reinforcing fibre polymer composite" used herein refer to polymer composites made by reacting a curable resin with a reactive diluent in the presence of a free radical initiator. Typically, the curable resin is an unsaturated polyester resin and the reactive diluent is a vinyl monomer. Reinforcing materials such as glass fibre are often included in the formulations to provide dimensional stability and toughness. The traditional fibre lengths typically range from about 12 mm up to tens of meters in the case of, for example, filament winding. In these composites, the majority of the fibres are held in position by mechanical friction and there is only relatively weak bonding of the fibres to the resin matrix. Therefore, the performance of such polymer composites is largely due to the length of the fibres employed and in these composites there is a discontinuity/gap between the fibres and the resin. Cracks initiated in the resin matrix find it very difficult to jump gaps, therefore in these composites cracks initiated in the resin are usually arrested at the resin boundary and do not reach the glass surface. However, traditional fibre composites have a number of shortcomings, such as it is difficult to "wet" the fibres with the resin prior to curing, and even dispersion of long fibres throughout the composite is difficult, especially for complex parts. In addition, such traditional reinforced fibre polymer composites are limited by their production techniques which generally require manual layering or are extremely limited in the shape and complexity of the moulds.

The terms "Syntactic Foam Moulding Product" and "Curable Tooling Resin Product" as used herein refer to a composition, comprising: i) a plurality of treated reinforcing microfibres; ii) a coupling agent; and iii) a curable resin (sometimes referred to as a syntactic foam).

The terms "fibre" and "fibres" are to be taken to also include platelet and platelets respectively. Fibre should also be construed to incorporate spherical glassy components, such as cenospheres, zenospheres plerospheres or combinations thereof. Other spherical or shaped additives that may be used included glass beads and/or micro balloons (microscopic glass beads), which may be sourced, for example, from fly ash or bottom ash. In certain embodiments, glass fibres may be the preferred fibres. However glass fibres, aramid fibres, mineral fibres, such as wollastonite and mica, ceramic fibres, cellulose fibres, carbon fibres, or combinations thereof may also be used. The terms "fibre" and "filament" may be used interchangeably herein and includes chopped bundles of fibres, individualised fibres, or combinations thereof.

The term "mechanical consolidation" (Example, see FIG. 3: laminate being mechanically consolidated using a roller) as used herein refers to a substantially mechanical process of compacting and/or saturating reinforcing fibres with a liquid curable resin such that the fibres are substantially homogenously distributed throughout a portion, or a substantial portion, of the liquid curable resin. For example, one mechanical consolidation process is the "hand lay-up" method of fabrication in which reinforcing fibres are added to an open mould and the liquid curable resin system is "wetted out" on the reinforcing fibres by, for example, hand rollers, brushes and squeegees (See FIG. 3).

The terms "wettability", "wetting out", "wet through" etc as used herein refers to the relative degree to which a resin will spread onto or coat the reinforcing fibres and/or penetrate bundles of filaments. Wettability may be expressed as a contact angle defined as the angle between a liquid (the resin) and a solid (the glass fibres) at the solid-liquid interface. The contact angle may be acute for wetting (where the liquid adheres to the surface) and may be obtuse for non-wetting (where the liquid does not adhere). For example poor wettability (a relatively high surface tension) may have a contact angle about >30° and good wettability (a relatively low surface tension) may have a contact angle about <30°. In certain embodiments an increase in wettability may be considered to be an increase in the adhesion force between two different materials.

Figure 2:
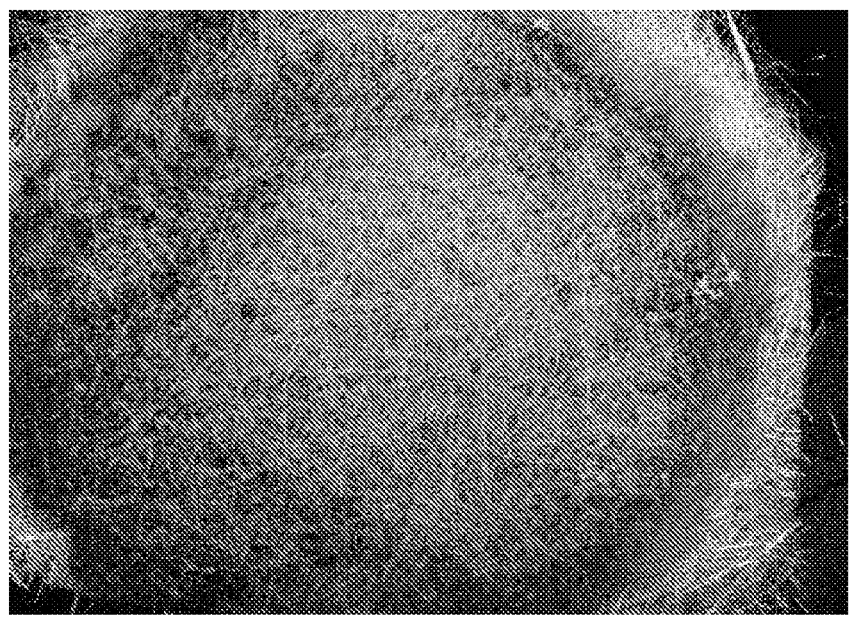
FIG. 2: illustrates jackstrawing in a laminate.

The terms "jackstrawing" and "spiderwebbing" (See FIG. 2) are terms of art used to describe a fibreglass surface having turned white in the laminate because the glass has separated from the resin.

The terms "property" and "properties" are to be taken to include typical mechanical, physical, chemical properties or combinations thereof of polymers and/or cured resins. For example, mechanical properties are those selected from the group consisting of flexural and/or tensile strength, toughness, elasticity, plasticity, ductility, brittleness, impact resistance or combinations thereof. Chemical and physical properties are those selected from the group consisting of density, hardness, cross-link density, molecular weight, chemical resistance, degree of crystallinity or combinations thereof.

In certain embodiments, the direct-to-mould method, comprises: i) forming a substrate; ii) applying a fibre reinforced structural laminate to the substrate, wherein said fibre reinforced structural laminate comprises: a) a first plurality of reinforcing fibres; and b) a first curable resin mixture, comprising a first curable resin and optionally a wetting agent; iii) applying a syntactic foam moulding product to the fibre reinforced structural laminate, wherein said syntactic foam moulding product comprises: a) a plurality of treated reinforcing microfibres; b) a second curable resin, thixatropes (and other additives) and plastic spheres/hemispheres; and c) a coupling agent; iv) optionally applying a tooling gel coat to the surface of said syntactic foam moulding product for the manufacture of moulds that require a high gloss surface finish; and v) curing said composite mould; wherein the method of producing the composite mould is inclusive or exclusive of making and/or using a plug or composite plug. Certain embodiments are directed to methods for producing a composite mould, comprising: i) forming a substrate; ii) applying a fibre reinforced structural laminate to the substrate, wherein said fibre reinforced structural laminate is prepared by contacting a first plurality of reinforcing fibres with a first curable resin mixture, wherein said first curable resin mixture comprises a first curable resin and optionally a predetermined quantity of a wetting agent; iii) applying a syntactic foam moulding product to the fibre reinforced structural laminate to add rigidity and provide a durable, and machineable moulding surface for the production of composite parts to the surface of said fibre reinforced structural laminate, wherein said syntactic foam moulding product is prepared by combining: a) a plurality of treated reinforcing microfibres; b) a second curable resin, plastic spheres/hemispheres, thixatropes and other additives; and c) a coupling agent; iv) optionally applying a tooling gel coat to the surface of said syntactic foam moulding product for the manufacture of moulds that require a high gloss surface finish; and v) curing said composite mould; wherein the method of producing the composite mould is inclusive or exclusive of making and/or using a plug or composite plug.

In certain embodiments, the direct-to-mould method, comprises: i) forming a substrate; ii) applying a fibre reinforced structural laminate to the substrate, wherein said fibre reinforced structural laminate comprises: a) a first plurality of reinforcing fibres; and b) a first curable resin mixture, comprising a first curable resin and optionally a wetting agent; iii) applying a syntactic foam moulding product to the fibre reinforced structural laminate, wherein said syntactic foam moulding product comprises: a) a second plurality of treated reinforcing microfibres; b) a syntactic foam moulding product comprising a second curable resin, plastic spheres/hemispheres, thixatropes and other additives; iv) optionally applying a tooling gel coat to the surface of said syntactic foam moulding product for the manufacture of moulds that require a high gloss surface finish; and v) curing said composite mould; wherein: i) optionally applying a foam sealer product to the substrate prior to applying the structural laminate, wherein the optional foam sealer product comprises: a) a plurality of treated reinforcing microfibres and/or Mica flakes; b) a foam sealer; and c) a coupling agent; and ii) the method of producing the composite mould is inclusive or exclusive of making and/or using a plug or composite plug.

Certain embodiments are directed to methods for producing a composite mould, comprising: i) forming a substrate; ii) applying a fibre reinforced structural laminate to the substrate, wherein: a) the fibre reinforced structural laminate requires less mechanical consolidation during application to the surface of said substrate as compared with traditional composite mould methods, or substantially no mechanical consolidation during application to the surface of said substrate; and b) said fibre reinforced structural laminate is prepared by contacting a first plurality of reinforcing fibres with a first curable resin mixture, wherein said first curable resin mixture comprises a first curable resin and optionally a predetermined quantity of a wetting agent; iii) applying a syntactic foam moulding product to the fibre reinforced structural laminate to add rigidity and provide a durable, and machineable moulding surface for the production of composite parts to the surface of said fibre reinforced structural laminate, wherein said syntactic foam moulding product is prepared by combining: a) a plurality of treated reinforcing fibres; b) a syntactic foam; and c) a second curable resin mixture comprising a second curable resin and a predetermined quantity of a coupling agent; iv) optionally applying a tooling gel coat to the surface of said syntactic foam moulding product for the manufacture of moulds that require a high gloss surface finish; and v) curing said composite mould; wherein: i) optionally applying a foam sealer product to the substrate prior to applying the structural laminate, wherein the optional foam sealer product comprises: a) a plurality of treated reinforcing microfibres and/or Mica flakes; b) a foam sealer; and c) a coupling agent; and ii) the method of producing the composite mould is inclusive or exclusive of making and/or using a plug or composite plug Certain disclosed embodiments have one or more of the following advantages:

Direct-to-mold obviating the need for a plug.

Sprayable and less labour intensive.

Whether it is used direct to mold or used for making a plug, there are substantially less air voids in the syntactic foam layer when applied—obviating the expensive and time consuming operation of filling exposed air voids after machining (which is commonplace with troweled resins or pastes).

Certain embodiments contain soft fillers so this minimizes tool wear.

Certain embodiments are sprayable so they can fill complex mould shapes with minimum machining required and substantially no requirement for manually applied filler compounds.

Certain embodiments of the system comprise: a) a sealer if required; b) a fiberglass laminate layer; and c) a sprayed syntactic foam; wherein the three components are substantially dimensionally stable and have negligible shrinkage and warpage after spraying.

Certain embodiments may be used without a tooling gel coat.

In certain embodiments the machining leaves plastic shavings and no dust or substantially less dust.

Certain embodiments may be recoated, repaired, re-machined or combinations thereof as the syntactic foam moulding product, has excellent adhesive qualities.

Certain embodiments may mould in its own stiffeners or reinforcing ribs.

Certain embodiments may be modified to spray using standard fiberglass depositors.

Certain embodiments are strong enough to be machined into serviceable components.

Certain embodiments accept unsaturated polyester tooling gel coats and flow coats.

Certain embodiments are compatible with Duratech mould repair gel coat systems.

Certain embodiments may be cast into machineable blocks at 60 mm, 65 mm 70 mm or 75 mm thick per pour.

Certain embodiments enable the development of a mould and cast a part within 24-36 hours Certain embodiments using a syntactic foam moulding product, comprising a plurality of treated reinforcing microfibres, may already be loaded with glass microfibres so it only has to be stirred and promoted. Additional fillers may not be required Certain embodiments provide better OH&S outcomes because, for example, there is less dust from fewer layers and less manual intervention.

Certain embodiments provide greener alternatives because, for example, the process uses less materials, less trimming, less wastage or combinations thereof and it may obviate the need to make a mould.

Certain embodiments the syntactic foam moulding product, comprising a plurality of treated reinforcing microfibres, the thixatropes already added, which may prevent, or substantially reduce, the glass and plastic fillers from settling and/or separating Certain embodiments, the syntactic foam moulding product may be highly durable, substantially not porous and may be used to cast parts, without the need for a gel-coat. Gel-coats may be desirable for high gloss surfaces and/or to help with the release of complex shapes.

Certain embodiments require fewer steps in the mould/plug making process, less surface preparation between the laminated layers, less trimming or combinations thereof.

Certain embodiments permit successive layers of the syntactic foam moulding product to be built up rapidly, without manual intervention at each stage, which improves operational efficiencies and/or is less costly Certain embodiments may not require (or in the case of substantially larger moulds significantly reduces the need) to build steel sub-structures Certain embodiment the syntactic foam moulding product may be used to construct reinforcing ribs.

Certain embodiments may not require separate core materials for dimensional stability and/or reinforcement Certain embodiments generate less dust.

Certain embodiments require less clean-up.

Certain embodiments require lower overheads and/or less utilization of resources which improves operational efficiencies.

In certain embodiments of the disclosed methods, the syntactic foam moulding product adds rigidity and provides a durable, and machineable moulding surface for the production of composite parts. In certain embodiments the syntactic foam moulding product is sprayable and machineable.

Certain embodiments of the disclosed methods result in time savings with respect to the time required to produce the composite mould. For example using certain disclosed methods the time required may be reduced by at least 30%, 40%, 50%, 60% or 70% as compared with as compared with traditional plug or composite plug composite mould methods.

Certain embodiments of the disclosed methods result in a reduction of the amount of materials needed to produce the composite mould. For example, using certain disclosed methods may result in a reduction of the materials used by at least 30%, 40%, 50%, 60% or 70% as compared with as compared with traditional plug or composite plug composite mould methods.

Certain embodiments of the disclosed methods result in saving cost and/or labour. For example, certain disclosed methods may result in a cost savings or reduced cost of at least 30%, 40%, 50%, 60% or 70% as compared with as compared with traditional plug or composite plug composite mould methods.

Certain embodiments, of the disclosed methods may result in reducing the time required to produce the composite mould by at least 30%, 40%, 50%, 60% or 70% as compared with as compared with traditional plug or composite plug composite mould methods; and reducing the materials required to produce the composite mould by at least 30%, 40%, 50%, 60% or 70% as compared with as compared with traditional plug or composite plug composite mould methods.

Certain embodiments are directed to methods of producing mould composites wherein the mould composite is structurally sound, can have reinforcing ribs designed in merely by increasing the thickness of the syntactic foam and does not require external reinforcing (usually steel sub-structures), minimal air pockets and does not have voids from a paste depositor or extruder, not porous so it produces a moldable surface without requiring a gel coat to produce a high gloss finish, a reduction in labour, a reduction in costs, a reduction in the amount of materials used, readily machineable because it is not brittle and does not crack, easily retouched and repairable as the syntactic foam has excellent adhesive qualities, able to pull a larger number of parts as compared with traditional plug or composite plug composite moulds, for example 20 to 1000 parts, 20 to 100 part, 50 to 200 parts, 100 to 1000 parts, etc, or combinations thereof.

Substrate

The substrate that is used for the mould and/or plug, according to certain embodiments may be formed from a variety of materials. There are typically two kinds of substrates on which composite moulds or plugs may be made:

a) structural substrates made from sturdy material such as timber, composite materials, structural fibre boards, MDF etc. These substrates have structural strength in their own right.

b) non-structural substrates, such as plastic foams, meshing, or fabric supported over a metal or wooden frame are typically considered non-structural substrates.

For example, the substrate may be selected from:
a) a polystyrene foam substrate;
b) a wooden substrate;
c) a plywood substrate;
d) a particle board substrate;
e) a MDF substrate;
f) a polyurethane foam substrate;
g) a rigid plastic foam substrate;
h) a polymer concrete substrate;
i) a concrete substrate;
j) a fibreglass substrate;
k) a plastic composite substrate; or
l) combinations thereof.

As discussed herein, if a polystyrene foam substrate is selected, in most instances an additional layer or sealer may be needed to protect the polystyrene foam substrate from being attacked or degraded from one or more components of the other layers to be used in forming the composite. For example, monomers in the resins found in the structural layer may attack or degrade the polystyrene foam. Depending on the substrate selected and the composition of the additional layers there may be other instances where an additional layer or sealer may be used to protect the substrate from one or more components of the additional layers used in the composite.

The substrate may be formed, cut, machined, CNC machined, shaped or combinations thereof in a number of ways depending on the desired shape and/or application.

Sealer

As discussed herein, if desired the substrate may be further protected from one or more components from the other layers by applying a sealer layer to the substrate.

For example, if the substrate is construction in whole or in part from a polystyrene foam, then an additional sealing layer may be used.

Certain embodiments of the present disclosure provide methods for preparing and/or applying a foam sealer product, such as for those moulds constructed on a polystyrene foam substrate, wherein the foam sealer product protects the polystyrene foam substrate from attack or degradation. In certain embodiments, the foam sealer product comprises: i) a plurality of treated reinforcing microfibres and/or Mica flakes; ii) a foam sealer; and iii) optionally a coupling agent. The foam sealer product may be applied to the substrate prior to the applying a structural laminate. The foam sealer product may be sprayable, rollable, brushable or combinations thereof. The foam sealer can be a sprayable or rollable water based sealer formulated from polyvinyl alcohol, or a sealer made from a low viscosity sprayable or rollable epoxy compound that when cured allows unsaturated polyester or vinyl ester resins to adhere to its surface, or a specially formulated vinyl functional resin that does not attack the polystyrene foam surface. In certain embodiments, the foam sealer may be applied at a temperature of at least 15° C., such as between 15° C. to 40° C., for example, at 18, 20, 22, 25, 30, or 35° C. In certain embodiments, the sealer may be applied at 18° C. and applied in thicknesses of between 1 to 2 mm and dried at ambient temperature for approximately 2 hours. The foam sealer may be applied to a thickness of between 0.1 mm to 4 mm, for example between 1 mm to 2 mm, such as 0.5, 1, 1.5, 2, 2.5, 3, or 3.5 mm. In certain embodiments, the applied foam sealer may be allowed to dry over a period of between 10 minutes to 12 hours, such as 1, 2, 3, 4, 5, 6, 8, or 10 hours.

Certain embodiments provide methods for producing a mould suitable for composite and fibre reinforced thermoset plastic moulding. If the mould substrate is polystyrene foam then a foam sealer may be required to protect the polystyrene foam from the monomers in the structural layer resins. The foam sealer can be a sprayable/rollable water-based sealer formulated from polyvinyl alcohol, or a sealer made from a low viscosity sprayable/rollable epoxy compound, which when cured allows unsaturated polyester or vinyl ester resins to adhere to its surface, or a specially formulated vinyl functional resin that does not attack the polystyrene foam surface. In certain applications, for applying the structural laminate to foam surfaces, especially polystyrene foam surfaces, it may be desirable to minimize the amount of walking on the machined foam surface. The application of a structural layer that requires little or no mechanical consolidation reduces or eliminates the need to walk on the machined foam. If the substrate is polyurethane foam then a sealer may not be required.

Structural Laminate

As discussed herein, a structural laminate layer may be applied to the substrate, or the sealed substrate to further strengthen the composite mould and/or plug. In certain embodiments, the structural laminate will comprise a plurality of fibres, a first curable resin and optionally a wetting agent (surface tension modifier).

In certain embodiments, the reinforcing fibre used in the structural laminate layer may comprise or be derived from a glass fibre, a glass microfiber, a microfiber, an aramid fibre, a mineral fibre (such as wollastonite and Mica), a ceramic fibre, a cellulose fibre, a carbon fibre, or combinations thereof. In certain embodiments, the reinforcing fibres are preferably mineral fibres and/or glass fibres chosen from E-, S- or C-class glass. The reinforcing fibre may be optionally treated (e.g., coated or modified) with a coupling agent, such as Dow® Z-6030. The reinforcing fibre may be an externally chopped glass fibre having a length, in certain applications, such as 16 mm, 18 mm, 20 mm or 22 mm, however may be as long as 30 mm, 40 mm, 50 mm, 60 mm or 70 mm for the structural layer.

In certain embodiments, the reinforcing fibre may be a structural fibre, a machineable fibre, a sprayable fibre, or a moulding fibre, or combinations thereof. The reinforced fibres may be prepared by adding surface treated fibres, such as glass microfibres and/or aramid fibres, mineral fibres (such as wollastonite and Mica), ceramic fibres, cellulose fibres, carbon fibres, or combinations thereof.

In certain embodiments, the structural laminate may be applied to a substrate, wherein the substrate comprises: i) a structural substrate, comprising: a solid substrate; a wooden substrate; a plywood substrate; a particle board substrate; a MDF substrate; a composite material; a structural fibre board; a polymer concrete substrate; a concrete substrate; a fibreglass substrate; a polymer composite substrate; or a plastic composite substrate; ii) a non-structural substrate, comprising: a foam substrate; a plastic foam, meshing, or fabric; a foam sealed polystyrene foam substrate; a polyurethane foam substrate; or a rigid plastic foam substrate; iii) a machined substrate, a CNC machined substrate, a fabricated substrate, and/or a sealed substrate; and/or iv) combinations thereof.

In certain embodiments these laminates may have a total thickness equal to or greater than 3 mm, 4 mm 5 mm, 6 mm, or 7 mm. When the structural laminate is however applied to a foam substrate, in certain embodiments, the thickness of the laminate may be equal to or greater than 5 mm, 6 mm, 7 mm, 8 mm, 9 mm, or 10 mm.

Certain embodiments of the present disclosure are directed to methods of manufacture that reduce the labour associated with direct to mould manufacturing processes. It is often difficult to access areas of large moulds, for example yacht deck moulds.

Certain embodiments of the no roll/limited roll laminate embodiments described herein may be designed to substantially limit the amount of mechanical consolidation required for structural laminate/laminates.

Certain embodiments of the applied fibre reinforced structural laminate: i) may reduce shrinkage of the formed composite mould, as compared to composite moulds exclusive of said structural laminate; ii) may provide mechanical strength; iii) may prevent material delaminating from the substrate, such as from a polystyrene foam layer substrate; and iv) may protect a substrate from an exotherm, such as a polystyrene foam layer substrate from an exotherm.

In certain embodiments, the methods for making the structural layer composite, such as a glass fibre structural laminate layer, comprises the steps of: contacting a first plurality of reinforcing fibres with a first curable resin mixture and curing. The first curable resin mixture comprises a first curable resin and optionally a predetermined quantity of a wetting agent, such as a surface tension modifier, prepared by reacting a polyol with an organo-functional silane.

In certain embodiments, wherein the wettability of the resin may be related to the difference in surface tensions of the resin and the glass in the structural layer, the choice of glass roving to use with the resin modified may be important. For example, in certain embodiments, the higher the surface energy of the glass fibres the better the wetting since this will reduce the contact angle between the resin and the glass fibres. (The lower the contact angle the better the wetting). In addition, the fibre reinforcement may have minimal sizing such that bundles (strands/subtext) of individual glass fibres readily dissociate into the individual filaments/fibres in certain applications. It may be desirable that the glass fibres be "soft" and resist the build-up of static electricity. In certain applications it may be desirable that the glass fibres are trialled with the surface energy modified resin to determine its suitability. A trial laminate made from the above components, which has not been mechanically consolidated, should show no, or minimal, jackstrawing when fully cured.

In certain embodiments, the surface tension (or contact angle) of the curable resin may be lower when modified with the surface tension modifier when compared with an unmodified curable resin. In other words, the wettability of the glass fibres is improved by reducing the surface tension of the resin such that the curable resin substantially wets out and permeates the reinforcing fibre with reduced mechanical consolidation during application. In certain embodiments the fibres may be saturated, or substantially saturated with resin with no, or minimal, mechanical consolidation during application required.

In certain embodiments, about 0.5% and 5% (w/w) of a surface tension modifier is added to the resin to improve the wettability. In certain embodiments, other ranges that may be used are 0.5% and 2%, 1% to 6%, 2% to 5%, 0.75% to 3% or 0.5 to 7% (w/w). The surface tension modifier may be synthetically prepared by reacting the polyol pentaerythritol with the organo-functional silane Dynasylan® Octeo (Degussa) (a monomeric medium chain length alkyl functional silane) or Dynasylan 9116 in the presence of a tin catalyst.

In certain applications, if a laminated glass reinforcement is desired, then the settings on the spray up depositor may be carefully set prior to applying the modified resin. In certain embodiments it may be desirable for only one "cheese"/"spool" of glass roving to enter the chopper motor through the centre portal in order to prevent "horns" from forming in the deposited laminates from where the chopped glass fibre from one "cheese" overlaps the chopped glass fibre from a second "cheese". Chopping one roving may produce a significantly more even glass distribution on the mould. The depositor typically is set up in such a way that it is delivering the required resin-to-glass ratio "off the gun". Preferably no further wet-out of the deposited laminate is required. In addition, the laminate for the structural layer may be deposited in approximately 0.75 mm, 1 mm, 1.25 or 15 mm passes. This does not slow down the process when spraying up large objects such as tank moulds, boat hull moulds, swimming pool moulds or large panel moulds etc. Additionally, the gel-time of the resin can be reduced to approximately 5 minutes, 7 minutes, 10 minutes, or 15 minutes allowing for multiple layers to be deposited without stopping the process.

In certain embodiments, the viscosity of the curable resin may be reduced to assist in wetting the glass fibres and syntactic foam. For example about 5% to about 30% by weight of one or more reactive diluents may be added to the curable resin, and may be chosen from the following monomers: ethyl acrylate, butyl acrylate, HEMA, IBMA, MMA, isobornyl methacrylate and styrene. Other ranges that may be used in certain embodiment are 10% to 35%, 5% to 15%, 15% to 30%, or 5% to 20%. Iso-butyl methacrylate may be used in certain embodiments. Low molecular weight curable resins may be used for assisting in wetting of the glass in some embodiments.

Further still, at least one thixatropic agent may be incorporated into the curable resin. Yet further still, the glass fibres typically will not have been heated above 130° C., 140° C., 145° C., 150° C., 155° C. or 160° C., after they were manufactured because this may affect the glass surface by reducing the unbound silanol moieties, which are sites for hydrogen bonding with components of the curable resin.

A specified quantity of a wetting agent (sometimes referred to as a surface tension modifying wetting agent, a surface tension modifier, or a surface tension modifying agent), may be combined with the first curable resin in a sufficient amount to lower the surface tension of the first curable resin in order to substantially wet out and penetrate the first plurality of reinforcing fibres. In certain embodiments, the first plurality of reinforcing fibres may be treated or untreated reinforcing fibres. For example, the first plurality of reinforcing fibres may be treated or untreated glass fibres. These methods result in reduced mechanical consolidation and/or no mechanical consolidation during application of the structural layer. In certain preferred embodiments the fibres are saturated with resin with no applied mechanical consolidation during application. In certain embodiments, the first curable resin may be a polyester or an epoxy-based vinyl ester resin. In certain embodiments, the structural laminate may be mechanically rolled out. In certain embodiments, the applied structural laminate is cured over a period of between 2 hours to 12 hours, such as 3, 4, 5, 6, 8, or hours. In certain embodiments, the applied structural laminate is cured at a temperature of at least 15° C., such as between 15° C. to 40° C., for example, at 18, 20, 22, 25, 30, or 35° C. In certain embodiments, once the structural laminate is cured, it may be serviceable for further use or additional layers to be applied.

Surface Tension Modifiers

In some aspects, the surface tension modifier may be prepared according to the following procedure: a solution of an organo-functional silane, such as Dynasylan® Octeo, reacted with a poly-functional alcohol, such as pentaerythritol, in the presence of a catalyst, such as a transition metal catalyst, for example a tributyl tin catalyst, and heated slowly from 100° C. to 160° C. until no more ethanol is liberated. For every one mole of pentaerithritol in the reactor there may be 5 moles of silane to prevent polymerization and gel formation during the reaction.

Reaction conditions for the preparation of the surface tension modifier:

Whilst in some aspects, the surface tension modifier may be prepared by reacting Dynasylan® Octeo with pentaerythritol, other modifiers may be prepared with similar or substantially similar performance. Other exemplary organo-functional silanes may comprise a carbon-carbon double bond, an epoxy group, and/or an amine functional group. For example, exemplary organo-functional silanes may comprise: Dynasylan® OCTEO (or DOW® Z6341) the active ingredient of which is triethoxyoctyl silane; Dynasylan® GLYMO (or DOW® Z6040) the active ingredient of which is glycidoxy (epoxy) functional methoxy silane; Dynasylan® IBTEO (or DOW® Z2306) the active ingredient of which is triethoxyisobutyl silane; Dynasylan® AMEO (or DOW® Z6020) the active ingredient of which is 3-aminopropyltriethoxysilane; Dynasylan® MEMO (or DOW® Z6030) the active ingredient of which is methacryloxypropyltrimethoxysilane; DOW® Z6032 the active ingredient of which is cationic styrlamine functional silane; DOW® Z6172; DOW® Z6300; DOW® Z6011 Aminopropyltriethoxysilane; DOW® Z6075 Vinyltriacetoxysilane; and other vinyl, epoxy, amine or alkyl function silanes.

A person skilled in the art will appreciate that the above mentioned list is indicative only and not exhaustive. Other surface tension modifiers with appropriate properties may be used.

In certain preferred embodiments, the surface tension (or contact angle) of the curable resin is lower if modified with certain wetting agents, when compared with an unmodified curable resin. The contact angle of the resin may be defined as the angle between the liquid (the resin) and a solid (the glass fibres) at the solid-liquid-gas interface. The contact angle is typically acute for a relatively wetting resin (where the liquid adheres to the surface) and obtuse for a relatively non-wetting resin (where the liquid does not adhere). However, this may not be the case for other embodiments. The wettability of the glass fibres may be improved, in certain embodiments, by reducing the surface tension of the resin when between about 1 and 5% of a surface tension modifier is added to the resin. However, it will be appreciated that as little as 0.1% of the surface tension modifier of the disclosure to up to about 5% can be added. In some embodiments, the surface tension modifier of the disclosure may be added at 0.5, 1, 1.5, 2, 2.5, 3, 3.5, 4, 4.5 or 5%. In some embodiments the surface tension modifier of the disclosure may be added at 0.5, 1, 1.5, 2, 2.5, 3, 3.5, 4, 4.5 or 5% in 0.3%, 0.4%, 0.5% 0.6% or 0.7% increments. In some embodiments, the surface tensions modifier may be added all at once or in various fraction increments.

In other embodiments the surface tension modifier of the disclosure can be added at between 0.5 to about 1, 1 to about 1.5, 1.5 to about 2, 2 to about 2.5, 2.5 to about 3, 3 to about 3.5, 3.5 to about 4, 4 to about 4.5, or 4.5 to about 5%. In certain embodiments, the preferred surface tension modifier is synthetically prepared by reacting a polyol with a trialkoxysilane ($RSi(OR')_3$) in the presence of a catalyst, such as tri-butyl tin, and adding heat. The polyol may be a tri-hydroxy compound, such as trimetholylpropane, or a tetra-hydroxy compound, such as pentaerythritol. However, it will be appreciated that other polyols fall within the purview of the present disclosure, for example dihydroxy compounds and substituted hydroxy-functional compounds. In certain embodiments, the trialkoxysilane silane is preferably chosen from the group consisting of Dynasylan® Octeo (Degussa) (a monomeric medium chain length alkyl functional silane) or Dynasylan 9116. The reaction between the polyol and the trialkoxysilane may be partial or complete.

Some of the improvements that certain embodiments of the present disclosure provide may be seen in wicking experiments. For example, in one set of comparative tests a strand of fibreglass was partially immersed in liquid resin and the degree to which the resin wicks up the strand of fibreglass was noted. It was found that resin untreated according to the certain embodiments of the present disclosure typically wicks less than about 0.5 mm. However, it was found that the same resin treated with the surface tension modifier of the present disclosure wicks up the strand of fibreglass to about 2 to 4 mm in height. This demonstrates the improvements in reduction of contact angle that certain disclosed embodiments provide. Other tests to demonstrate the effects of the surface tension modifier of certain embodiments of the disclosure comprise "sprinkling" fibreglass strands onto resins treated and not treated with the surface tension modifier of the disclosure. In certain embodiments, the fibres immersed into the treated resin show little or no debonding after post curing of the laminate, however, the fibres in the untreated resin show visible jackstrawing/debonding due to forces generated as the resin shrinks during the curing reaction and when the cured panel was strained well below its yield point (See FIG. 2).

A skilled person will appreciate that the contact angle may also be affected by the surface energy of the glass. For example, for a given resin, the higher the surface energy of the glass, the lower the contact angle of a resin wetting the glass. The lower the contact angle the better the wetting. In some embodiments, it is useful if the glass surface has a high population of unbound silanol moieties. These silanol moieties may be prime sites for hydrogen bonding with suitable components of certain resin embodiments disclosed herein. The presence of these silanol groups may enhance the adhesive forces between the resin and the glass. This hydrogen bonding/increased adhesive forces augments the low surface energy of the resin and further aids wetting. Some glass fibres may not have suitable surface properties.

Certain embodiments of the present disclosure contemplate that unsaturated polyester resins and vinyl ester resins suitable for formulating laminating resins may be modified with the surface tension modifier. In certain embodiments the curable resin may be a single resin or a resin system and is preferably chosen from a liquid unsaturated polyester resin or a liquid vinyl ester resin. In one example the resin is Derakane® epoxy vinyl ester resin 411-350 (Ashland Chemicals). In another example, the resin may be a general purpose unsaturated polyester laminating resins, for example, those manufactured by RYCOL®, AOC®, COOKS COMPOSITES®, ETERSET®, NAN YAR®, DSM®, TOTAL®, NUPLEX®, etc. However, in certain embodiment's low molecular weight resins may be used since they have lower high shear viscosities for a given monomer content, and the lower the high shear viscosity the better the wetting in many instances.

In other embodiments at least one reactive diluent and/or thixatropic agent may be incorporated in the curable resin. For example, suitable thixatropic agents may be fumed silica, precipitated silica, suitable mineral fibres, organic thixatropes such as hydrogenated caster oils and amide thixatropes or blends of these thixatropic agents.

Suitable reactive diluents may be chosen from the following monomers: ethyl acrylate, butyl acrylate, HEMA, IBMA, MMA, isobornyl methacrylate and styrene. In certain embodiments, these particular monomers may be very effective in assisting the surface tension-modified resin to wet the glass fibres. About 5% to about 30% of a reactive diluent may be added to the resin. In certain embodiments, other ranges of reactive diluents may be used. It will however be appreciated the disclosure is not limited to the aforementioned range or types of monomers.

A skilled person will appreciate that addition of a reactive diluent may reduce the viscosity of the curable resin, and it will also be appreciated that the viscosity of a curable resin may have a different property to its surface tension. Viscosity of a liquid is a measure of its ability to flow and surface tension is the energy required to stretch a unit of surface. Whilst the addition of a reactive diluent to a curable resin, in certain embodiments, may go part way to improving wettability, modifying the surface tension of the curable resin may play a greater role in affecting the wettability of the glass reinforcing fibres.

In certain embodiments, by appropriate dosing of the curable resin with the surface tension modifier production of composite articles may be simplified and speed of production increased by reducing or substantially eliminating the need for mechanical consolidation of the reinforcing fibres in the curable resin. This mechanical consolidation, which is required for conventional processes increases the time required to produce such composite articles. The use of the surface tension modifier may provide a significant advance over conventional systems.

For example, in one test conducted a square meter of mould could be sprayed with resin containing the surface tension modifier of the disclosure and glass. It was found that the resin/glass laminate de-aerated and consolidated within about 5 minutes, with no mechanical consolidation. For large mould construction e.g. swimming pool and yacht hull moulds, in practice three 'laminators' are typically required to keep up with a 'gun operator'. However, using the surface tension modifier of the disclosure it was found that only one laminator was required to keep up with the gun operator, and the laminator was only required to consolidate the laminate into the tight corners of the mould being manufactured. This represents a clear saving in manpower, and therefore reduces the cost and time to produce large moulds.

Certain embodiments provide improved wettability of a resin by adding to the resin a predetermined quantity of surface tension modifier, being a reaction product between a polyol and an organo-functional silane, to improve the wettability of the resin, such that mechanical consolidation of fibres in the resin is eliminated when depositing the bulk of the fibre reinforced structural laminate.

Syntactic Foam Moulding Product

As discussed herein, a syntactic foam moulding product may be prepared according to the methods disclosed herein. In certain embodiments, a syntactic foam moulding product may be applied to a structural laminate layer in forming a composite moulds and/or plugs.

Certain embodiments of the present disclosure provide methods for producing a syntactic foam moulding product, comprising: contacting a plurality of treated reinforcing microfibres and a curable resin (sometimes referred to as a syntactic foam). In certain embodiments, the syntactic foam moulding product may be applied to the applied and/or cured structural laminate, for example, the syntactic foam moulding product may be sprayed, brushed, or rolled onto the applied and/or cured structural laminate.

In certain embodiments, the treated reinforced microfibre content may be in the range of between about 2-15 wt. % of the weight of the resin, such as 5 wt. %, 7 wt. %, 8 wt. %, 9 wt. %, 10 wt. %, 11 wt. %, 12 wt. %, or 13 wt. % of the weight of the resin in the syntactic foam moulding product.

The syntactic foam moulding product may be applied to a thickness in the range of between 4 mm to 25 mm, for example, at least 5, 6, 7, 8, 9, 10, 12, 15, 17, 21, or 23 mm thick. The thickness of the applied syntactic foam moulding product may depend on the size of the final mould and/or the accuracy of the CNC machine.

The syntactic foam moulding product may be applied at 4 mm thick without sag. The applied syntactic foam moulding product may gel within 5 to 20 minutes, such as at 10 or 15 minutes, at ambient room temperature, such as between 18° C. to 40° C. In certain embodiments, the syntactic foam moulding product is applied at a temperature at or above 18° C. The syntactic foam moulding product may be applied in successive layers, for example, applied at 20 minute intervals, after it has gelled, and may be machineable after drying and/or curing over 4 hours. The gel times and cure times will vary depending on the temperature. For example, the time to form a gel may be reduced to 5 minutes when applied or dried at 40° C., or may be extended to 30 minutes when applied or dried at 18° C. The overall curing time will be affected by temperature and is dependent on the amount of catalyst that is added. For example, a catalyst may comprise an organo-transition metal catalyst, such as an organo-tin catalyst. Application of the Sprayable, CNC Machineable, Syntactic Foam Layer: The syntactic foam may be sprayed on the structural layer in passes that lay an approximate amount of foam per pass, for example, 1 mm, 2 mm, 3 mm, 4 mm, 5 mm or 6 mm. Typically the pass is allowed to gel, or substantially gel. before the next pass is applied. If three passes are applied in rapid succession and 6-9 mm of syntactic foam has been applied the laminate should be allowed to exotherm and cool before further application. This process needs to be repeated until the required amount of syntactic foam has been applied to the structural layer.

Machining and Hand Finishing the Syntactic Foam: Because the syntactic foam may be mechanically strong and/or tough enough in its own right to produce a satisfactory moulding surface, sanding out the machining marks and fairing the shape may be considerably more difficult than when using other tooling products. It is therefore advisable in certain applications to use a fine finishing cut when machining the final pass.

In certain embodiments, the treated reinforcing microfibre may comprise or be derived from a plurality of treated glass microfibres, an aramid microfibre, a mineral microfibre (such as wollastonite and Mica), a ceramic microfibre, a cellulose microfibre, a carbon microfibre, or combinations thereof. In certain embodiments, the microfibres are preferably treated reinforcing glass microfibres, chosen from E-, S- or C-class glass or combinations thereof. In certain embodiments, the microfibres may be treated (e.g., coated or modified) with a coupling agent, such as Dow® Z-6030.

In certain embodiments, the microfibres that may be used to prepare the treated reinforcing microfibres, may include mineral fibres and/or glass fibres chosen from E-, S- or C-class glass, that are coated or treated with a coupling agent. In certain embodiments, a preferred coupling agent comprises a plurality of molecules, each having a first end adapted to bond to the glass fibre and a second end adapted to bond to the resin when cured. Preferably the coupling agentis Dow® Z-6030. However, other coupling agents may be used such as Dow® Z-6032, and Z-6075. Similar coupling agents are available from DeGussa® and Crompton® Specialties, for example Dynasylan® OCTEO, DOW® Z6341, Dynasylan® GLYMO, DOW® Z6040, Dynasylan® IBTEO, DOW® Z2306, Dynasylan® AMEO, DOW® Z6020, Dynasylan® MEMO, DOW® Z6032, DOW® Z6172, DOW® Z6300, DOW® Z6011 and DOW® Z6075. Other coupling agents would be apparent to the skilled person, such as titanates and/or other organo-metal ligands.

In certain embodiments, the reinforcing microfibres may be microglass microfibres, such as microglass milled microfibres, for example microglass milled microfibres that are E-glass filaments, S-glass filaments or C-glass filaments, wherein said filaments may be optionally coated or treated with a coupling agent. The microglass may be used as reinforcement in the structural laminate layer, the syntactic foam moulding product layer, or in the optional foam sealer product layer. The microglass may be used as reinforcement to provide the resulting composite moulds increased mechanical properties (impact, tensile, compressive and flexural), improved dimensional stability, minimized distortion at elevated temperatures, and/or combinations thereof, as compared to composites exclusive of said microglass.

In certain embodiments, the microglass milled microfibres, such as E-glass filaments may have an average fibre diameter of at least 5 microns, such as in the range of between 5-15 microns, for example 5, 6, 7, 8, 9, 10, 11, 12, 13, or 14 microns, or less than or equal to 15 microns. The microglass milled microfibres may have a mean fibre length of at least 250 microns, such as in the range of between 250-800 microns, for example 300, 350, 400, 450, 500, 550, 600, 650, 700, or 750 microns, or less than or equal to 800 microns. The microglass milled microfibres may have a maximum fibre length of less than or equal to 1 mm, such as less than or equal to 950, 900, 850, 800, 750, 700, 650, 600, 550, 450, 400, 350, or 300 microns, or for example in the range of between 250 microns to 1 mm. The microglass milled microfibres may have an aspect ratio of the fibre length to the fibre diameter in the range of between 50:1 to 10:1, such as 47:1, 45:1, 42:1, 40:1, 38:1, 35:1, 34:1, 33:1, 32:1, 31:1, 30:1, 27:1, 25:1, 23:1, 20:1, 18:1, or 15:1. The microglass milled microfibres may have a loose bulk density in the range of between 0.15 g/cc to 0.35 g/cc, such as between 0.18 g/cc to 0.33 g/cc, 0.20 g/cc to 0.30 g/cc, 0.21 g/cc to 0.29 g/cc, 0.22 g/cc to 0.28 g/cc, 0.23 g/cc to 0.27 g/cc, 0.24 g/cc to 0.26 g/cc, 0.15 g/cc to 0.25 g/cc, 0.20 g/cc to 0.35 g/cc, or 0.25 g/cc to 0.35 g/cc. The microglass milled microfibres may have a moisture content of less than 1%, such as less than 0.9%, 0.8%, 0.7%, 0.6%, 0.5%, 0.4%, 0.3%, 0.2%, 0.1%, or less than 0.05%. The microglass milled microfibres may have a loss on ignition of less than 3%, such as less than 2.5%, 2%, 1.7%, 1.6%, 1.5%, 1.4%, 1.3%, 1.25%, 1.2%, 1.1%, 1.05%, 1%, 0.9%, 0.8%, 0.7%, 0.6%, or less than 0.5%. The microglass milled microfibres may be exclusive or substantially exclusive of contamination, such as exclusive of foreign matter, for example, dirt, oil, grease, and/or combinations thereof, and may be exclusive of hard lumps of nodulated and/or unmilled fibres. In certain embodiments, the microglass milled microfibres may be 80% exclusive of said contamination, for example, 85%, 90%, 95%, 96%, 97%, 98%, or 99% exclusive of said contamination. The microglass milled microfibres may be colored white or substantially white, such as 80% pure white, for example, 85%, 90%, 95%, 96%, 97%, 98%, or 99% pure white. The microglass milled microfibres may be sized as silane. The microglass milled microfibres may have the appearance of floccular.

In certain preferred embodiments, the reinforcing microfibres may be microglass milled microfibres that are E-glass filaments, wherein said filaments may have an average fibre diameter of 10 microns, a mean fibre length of 450 microns, a maximum fibre length of 700 microns, an aspect ratio of the fibre length to the fibre diameter of 33:1, a loose bulk density in the range of between 0.22 g/cc to 0.28 g/cc, a moisture content of less than 0.1%, a loss on ignition of less than 1.05%, may be exclusive or substantially exclusive of contamination, may be colored white, may be sized as silane, may have the appearance of floccular, and/or combinations thereof.

In certain embodiments, a preferred surface treated reinforcing microfibre, such as a ceramic or glass microfibre, is a reinforcing microfibre treated with an organo-functional silane (sometimes referred to as a coupling agent). In certain embodiments, the surface treated reinforcing microfibre may be treated with one or more treatments, wherein the one or more treatments may include the same or different organo-functional silanes. For example, a second treatment may be applied, using a modification of the previous organo-functional silane that has been applied to the reinforcing microfibre.

In certain embodiments, the modified organo-functional silane (sometimes referred to as a modified coupling agent), may be derived from partially reacting the organo-functional silane with a poly-functional alcohol in the presence of a catalyst, for example a tin catalyst, wherein the resulting modified coupling agent comprises said organo-functionality and hydroxyl functionality.

In certain embodiments, the hydroxyl groups of said modified organo-functional silane may be partially hydrated prior to treating the microfibres and/or adding to the curable resin or syntactic foam formulation.

In certain embodiments, the microfibre may be a structural microfibre, a machineable microfibre, a sprayable microfibre, or a moulding microfibre, or combinations thereof.

In certain embodiments, the syntactic foam fillers may be chosen from, fly ash, cenospheres, hollow ceramic spheres, or hollow plastic spheres, or combination thereof, and a substantially portion of the spheres are of a maximum diameter of 150 microns. In some aspects, a substantially portion of the spheres are of a maximum diameter of 80 microns, 100 microns, 125 microns, 150 microns or 175 microns. In some aspects, at least 50%, 60%, 70%, 80%, 90%, 95% 98% or 99% of the spheres are of a maximum diameter of 100 microns, 125 microns, 150 microns or 175 microns. In some aspects, the diameter is less than 100 microns.

In certain embodiments, syntactic microspheres may be added to the curable resin mixture in an amount in the range of between about 5% v/v to 40% v/v, such as 10% v/v, 15% v/v, 20% v/v, 25% v/v, 30% v/v, 35% v/v. In certain embodiments, the amount of syntactic microspheres added is determined such that all or substantially all of the microspheres are coated in the resin, thereby minimizing agglomerations of the microspheres. The syntactic microspheres may further include a combination of hollow phenoset or Potters Industries microspheres or solid plastic microspheres or hollow plastic microspheres cenospheres.

Certain embodiments of the present disclosure provide methods for producing a treated reinforced microfibre composite material. For example, a sprayable and/or machineable syntactic foam moulding product that comprises: contacting a plurality of reinforcing microfibres with a curable resin mixture, said curable resin mixture comprising a curable resin and a specified quantity of a coupling agent and applying said composition to the structural laminate and curing. In certain embodiments, the syntactic foam moulding product may be a resilient vinyl ester or polyester resin, wherein said curable resin comprises the following typical properties: 5-15% elongation, such as 6, 7, 8, 9, 10, 11, 12, or 13% elongation; 40-60 Mpa tensile strength, such as 45, 50, or 55 Mpa tensile strength; 50-90 Mpa flexural strength, such as 55, 60, 65, 70, 75, 80, or 85 Mpa flexural strength; and/or combinations thereof. Exemplary formulations for the formulations of certain syntactic foam moulding products are provided in table 1 below.

TABLE 1

(2nd Curable) Exemplary formulations of certain syntactic foam moulding product

| | Parts | Parts | Parts | Parts | Parts | Parts | Parts | Parts | Parts | Parts | Parts |
|---|---|---|---|---|---|---|---|---|---|---|---|
| Vinyl Ester | 100 | 95 | 90 | 85 | 80 | 75 | 70 | 65 | 60 | 55 | 50 |
| UPE ≤ | 0 | 5 | 10 | 15 | 20 | 25 | 30 | 35 | 40 | 45 | 50 |
| Cobalt ≤ | 0.6 | 0.6 | 0.6 | 0.6 | 0.6 | 0.6 | 0.6 | 0.6 | 0.6 | 0.6 | 0.6 |
| Potassium ≤ | 0.4 | 0.4 | 0.4 | 0.4 | 0.4 | 0.4 | 0.4 | 0.4 | 0.4 | 0.4 | 0.4 |
| Copper ≤ | 0.08 | 0.08 | 0.08 | 0.08 | 0.08 | 0.08 | 0.08 | 0.08 | 0.08 | 0.08 | 0.08 |
| AMS ≤ | 4.0 | 4.0 | 4.0 | 4.0 | 4.0 | 4.0 | 4.0 | 4.0 | 4.0 | 4.0 | 4.0 |
| Byk 515 ≤ | 1.5 | 1.5 | 1.5 | 1.5 | 1.5 | 1.5 | 1.5 | 1.5 | 1.5 | 1.5 | 1.5 |
| Byk 9928 ≤ | 2.0 | 2.0 | 2.0 | 2.0 | 2.0 | 2.0 | 2.0 | 2.0 | 2.0 | 2.0 | 2.0 |
| Fumed Silica Thixotrope ≤ | 6.0 | 6.0 | 6.0 | 6.0 | 6.0 | 6.0 | 6.0 | 6.0 | 6.0 | 6.0 | 6.0 |
| Clay Thixotrope ≤ | 6.0 | 6.0 | 6.0 | 6.0 | 6.0 | 6.0 | 6.0 | 6.0 | 6.0 | 6.0 | 6.0 |
| Byk 410 ≤ | 6.0 | 6.0 | 6.0 | 6.0 | 6.0 | 6.0 | 6.0 | 6.0 | 6.0 | 6.0 | 6.0 |
| Amide Thixotrope ≤ | 6.0 | 6.0 | 6.0 | 6.0 | 6.0 | 6.0 | 6.0 | 6.0 | 6.0 | 6.0 | 6.0 |

TABLE 1-continued (2nd Curable) Exemplary formulations of certain syntactic foam moulding product

| LPA ≤ | 35.0 | 35.0 | 35.0 | 35.0 | 35.0 | 35.0 | 35.0 | 35.0 | 35.0 | 35.0 | 35.0 |
|---|---|---|---|---|---|---|---|---|---|---|---|
| treated reinforcing Glass Microfibres ≤ | 25.0 | 25.0 | 25.0 | 25.0 | 25.0 | 25.0 | 25.0 | 25.0 | 25.0 | 25.0 | 25.0 |

| | Parts | Parts | Parts | Parts | Parts | Parts | Parts | Parts | Parts | Parts |
|---|---|---|---|---|---|---|---|---|---|---|
| Vinyl Ester | 45 | 40 | 35 | 30 | 25 | 20 | 15 | 10 | 5 | 0 |
| UPE ≤ | 55 | 60 | 65 | 70 | 75 | 80 | 85 | 90 | 95 | 100 |
| Cobalt ≤ | 0.6 | 0.6 | 0.6 | 0.6 | 0.6 | 0.6 | 0.6 | 0.6 | 0.6 | 0.6 |
| Potassium ≤ | 0.4 | 0.4 | 0.4 | 0.4 | 0.4 | 0.4 | 0.4 | 0.4 | 0.4 | 0.4 |
| Copper ≤ | 0.08 | 0.08 | 0.08 | 0.08 | 0.08 | 0.08 | 0.08 | 0.08 | 0.08 | 0.08 |
| AMS ≤ | 4.0 | 4.0 | 4.0 | 4.0 | 4.0 | 4.0 | 4.0 | 4.0 | 4.0 | 4.0 |
| Byk 515 ≤ | 1.5 | 1.5 | 1.5 | 1.5 | 1.5 | 1.5 | 1.5 | 1.5 | 1.5 | 1.5 |
| Byk 9928 ≤ | 2.0 | 2.0 | 2.0 | 2.0 | 2.0 | 2.0 | 2.0 | 2.0 | 2.0 | 2.0 |
| Fumed Silica Thixotrope ≤ | 6.0 | 6.0 | 6.0 | 6.0 | 6.0 | 6.0 | 6.0 | 6.0 | 6.0 | 6.0 |
| Clay Thixotrope ≤ | 6.0 | 6.0 | 6.0 | 6.0 | 6.0 | 6.0 | 6.0 | 6.0 | 6.0 | 6.0 |
| Byk 410 ≤ | 6.0 | 6.0 | 6.0 | 6.0 | 6.0 | 6.0 | 6.0 | 6.0 | 6.0 | 6.0 |
| Amide Thixotrope ≤ | 6.0 | 6.0 | 6.0 | 6.0 | 6.0 | 6.0 | 6.0 | 6.0 | 6.0 | 6.0 |
| LPA ≤ | 35.0 | 35.0 | 35.0 | 35.0 | 35.0 | 35.0 | 35.0 | 35.0 | 35.0 | 35.0 |
| treated reinforcing Glass Microfibres ≤ | 25.0 | 25.0 | 25.0 | 25.0 | 25.0 | 25.0 | 25.0 | 25.0 | 25.0 | 25.0 |

Hollow Plastic Spheres Variable depending on the hardness required by less than 40% by volume
Hollow Glass Spheres Variable depending on the hardness required by less than 40% by volume
Hollow Plastic Spheres Variable depending on the hardness required by less than 40% by volume In certain embodiments, the microfibres, such as mineral microfibres and/or glass fibres chosen from E-, S- or C-class glass, are coated or treated with a coupling agent. In certain embodiments, a preferred coupling agent comprises a plurality of molecules, each having a first end adapted to bond to the glass fibre and a second end adapted to bond to the resin when cured. Preferably the coupling agent is Dow® Z-6030. However, other coupling agents may be used such as Dow® Z-6032, and Z-6075. Similar coupling agents are available from DeGussa® and Crompton® Specialties, for example Dynasylan® OCTEO, DOW® Z6341, Dynasylan® GLYMO, DOW® Z6040, Dynasylan® IBTEO, DOW® Z2306, Dynasylan® AMEO, DOW® Z6020, Dynasylan® MEMO, DOW® Z6032, DOW® Z6172, DOW® Z6300, DOW® Z6011 and DOW®Z6075. Other coupling agents would be apparent to the skilled person, such as titanates and/or other organo-metal ligands or solid plastic microspheres or hollow plastic microspheres and/or cenospheres.

Certain embodiments, are directed to methods for preparing structural syntactic foams wherein the void content is greater than 60%, this calculation includes the solids in the foam as well as the syntactic foam particles themselves. Certain embodiments, are directed to methods for preparing structural syntactic foams wherein the void content is greater than 40%, 45%, 50% 55%, 60%, 65% or 70%, this calculation includes the solids in the foam not just the syntactic foam particles themselves. Certain embodiments are directed to methods for preparing structural foams that have adequate physical strength for a resilient base resin with a minimum tensile elongation of 3%.

Certain embodiments are directed to methods for preparing structural foams that have adequate physical strength for a resilient base resin with a minimum tensile elongation of 1%, 2%, 3% 4% 5% 7% or 10%. It was found, in certain applications, that reinforcing the syntactic foam with short glass or mineral microfibres coated with suitable coupling agents also improves the physical properties and therefore the performance of syntactic foams. Certain embodiments are directed to methods for preparing structural syntactic foams wherein the void content is greater than 50%, 55%, 60%, 65% and the resilient base resin has a minimum tensile elongation of 2%, 3% or 4%. Certain embodiments, are directed to methods for preparing structural syntactic foams wherein the void content is greater than 50%, 55%, 60%, 65%, the resilient base resin has a minimum tensile elongation of 2%, 3% or 4%, wherein the syntactic foam was reinforced with short glass or mineral microfibres coated with suitable coupling agents.

A typical structural syntactic foam formulation is given below:

| Vinyl Ester | 36.9% w/w |
|---|---|
| 1508 | 22.6% w/w |
| Styrene | 15.8% w/w |
| Syntactic Foam Sphere | 14.9% w/w |
| Treated Microfibres | 7.7% w/w |
| Thixatrope | 1.6% w/w |
| Co | 0.3% w/w |
| K | 0.12% w/w |
| Cu | 0.03% w/w |

Where the structural laminate is sprayed onto solid substrates such as timber products, concrete materials or composite materials, the sprayable syntactic foam moulding product may be applied to a minimum depth of 6 mm, 7 mm, 8 mm, 9 mm, 10 mm, 12 mm, or 15 mm. The minimum depth that the sprayable syntactic foam moulding product may be applied may vary depending on the size of the surface area. For example on foam substrates and moulds whose surface area is greater than 5 sqm the sprayable syntactic foam may be applied with a minimum depth of 11 mm, 12 mm, 13 mm, 14 mm or 15 mm. Theses minimum depths are after the final CNC machining process is completed.

A syntactic foam moulding product may be prepared and applied to other materials exclusive of a structural laminate. For example, the syntactic foam moulding product may be applied directly to a substrate or to a sealed substrate. In certain embodiments, the syntactic foam moulding product may be include less than 5 wt. % residual catalyst from the preparation of the coupling agent, for example, less than 4 wt. %, 3 wt. %, 2 wt. %, or less than 1 wt. %, with respect to the total weight of the syntactic foam moulding product. In certain embodiments, the syntactic foam moulding product may be include less than 5 wt. % residual unreacted polyol from the preparation of the coupling agent, for example, less than 4 wt. %, 3 wt. %, 2 wt. %, or less than 1 wt. %, with respect to the total weight of the syntactic foam moulding product. In certain embodiments, the syntactic foam moulding product may be include less than 5 wt. % residual unreacted organosilane from the preparation of the coupling agent, for example, less than 4 wt. %, 3 wt. %, 2 wt. %, or less than 1 wt. %, with respect to the total weight of the syntactic foam moulding product.

Gel Coat

In certain embodiments, a tooling gel coat may be optionally applied to the surface of the syntactic foam moulding product for the manufacture of composite moulds that require a high gloss surface finish. The tooling gel coat may be an industry standard tooling gel coat, which may provide better mold release and/or provide a smoother surface. The application of the tooling gel coat may be via painting or spraying. The resulting gel-coated surface may be serviceable after 24 hours if cured at ambient room temperature, such as at 25° C. For example, for composite moulds intended to produce more than twenty parts, a tooling gel coat designed to cure in air may be recommended. In certain embodiments, a gel coat may be applied after the syntactic foam moulding layer cures, for example 1 hour after the syntactic foam moulding cures at ambient room temperature, such as at 25° C. In certain embodiments, when the resulting composite mould is used as a molding or plug surface without the gel coat layer, the syntactic foam moulding may be cured for about 24 hours, such as between 20 to 30 hours, depending on the size of the resulting composite mould. In instances where no gel coat is required, the surface of the resulting composite mould may be machined and sanded, as required, and optionally finished with a fine grit sandpaper. Whether the mould is gel coated or not, the surface typically is allowed to cure for about 24 hours before casting parts. In certain embodiments, industry standard release agents are used with the resulting composite mould.

If the mould is intended to produce more than twenty parts a tooling gel coat designed to cure in air is recommended. A mixture of 60% by weight Duratec® filling compound and 40% by weight Duratec® gel coat may then be applied to the syntactic foam, which may be sanded and polished to achieve the desired gloss. Once the mould is complete the moulding surface may be sealed before a suitable release agent is applied according to the manufacturer's specifications.

Resins

In certain embodiments, the curable resin may be a resilient vinyl ester or polyester resin, wherein said curable resin comprises the following typical properties: 5-15% elongation, such as 6, 7, 8, 9, 10, 11, 12, or 13% elongation; 40-60 Mpa tensile strength, such as 45, 50, or 55 Mpa tensile strength; 50-90 Mpa flexural strength, such as 55, 60, 65, 70, 75, 80, or 85 Mpa flexural strength; and/or combinations thereof.

Typical curable resins are unsaturated polyester resins and the reactive diluent is a vinyl monomer. However, other thermoset resins may be used, such as acrylic, vinyl ester resins, urethane or epoxy resins. Such reinforced composites are used in many key industrial applications, including mould making, architectural construction, automotive, aerospace, marine and for corrosion resistant products.

The applicant contemplates that unsaturated polyester and vinyl ester resins suitable for formulating laminating resins can be modified with the surface tension modifier. The curable resin may be a single resin or a resin system and is preferably chosen from a liquid unsaturated polyester resin or a liquid vinyl ester resin. In one example the resin is Derakane® epoxy vinyl ester resin 411-350 (Ashland Chemicals). In another example, the resin may be general purpose unsaturated polyester laminating resins manufactured by REICHHOLD, ASHLAND CHEMICALS, RYCOL®, AOC®, COOKS COMPOSITES®, ETERSET®, NAN YAR®, DSM®, TOTAL®, NUPLEX®, etc. However, low molecular weight resins are preferred in certain embodiments since they have lower high shear viscosities for a given monomer content, and the lower the high shear viscosity the better the wetting.

In certain embodiments at least one reactive diluent and/or thixatropic agent may be incorporated in the curable resin. For example, suitable thixatropic agents may be fumed silica, precipitated silica, suitable mineral fibres, organic thixatropes such as hydrogenated caster oils and amide thixatropes or blends of any of these thixatropic agents.

Suitable reactive diluents may be chosen from the following monomers: ethyl acrylate, butyl acrylate, HEMA, IBMA, MMA, isobornyl methacrylate and styrene. In certain embodiments, these particular monomers are effective in assisting the surface tension-modified resin to wet the glass fibres. About 5% to about 30% of a reactive diluent may be added to the resin. Other ranges or types of monomers may also be used.

A skilled person will appreciate that addition of a reactive diluent will reduce the viscosity of the curable resin, and it will also be appreciated that the viscosity of a curable resin may have a different property to its surface tension. Viscosity of a liquid is a measure of its ability to flow and surface tension is the energy required to stretch a unit of surface. Therefore, in certain embodiments, whilst the addition of a reactive diluent to a curable resin will go part way to improving wettability, modifying the surface tension of the curable resin plays a role in affecting the wettability of the glass reinforcing fibres.

Certain embodiments, provide a reinforced composite material that requires reduced or no mechanical consolidation during application as compared to traditional prior art fibreglass reinforced composite materials. Furthermore, certain embodiments retain or improve mechanical properties, such as strength and toughness, chemical properties, aesthetic properties such as surface finish, or combinations thereof. Further still, since little or no mechanical consolidation is required in certain embodiments for the layers incorporating chopped fibres a 30 to 40% reduction in VOC (Volatile Organic Compounds) emissions is possible. This also makes coating the substrate a much easier and faster operation.

In certain embodiments, by appropriate dosing of the curable resin with the surface tension modifier production of composite articles is simplified and speed of production increased by reducing or eliminating the need for mechanical consolidation of the reinforcing fibres in the curable resin. This mechanical consolidation, which is required for conventional processes increases the time required to produce such composite articles. The surface tension modifier may provide a significant advance over conventional systems.

For example, in one test a square meter of mould could be sprayed with resin containing the surface tension modifier of certain embodiments. It was found that the resin/glass laminate de-aerated and consolidated within about 5 minutes, with no mechanical consolidation. For large mould construction e.g. swimming pool and yacht hull moulds, in practice three 'laminators' are typically required to keep up with a 'gun operator'. However, using the surface tension modifier certain embodiments it was found that only one laminator was required to keep up with the gun operator, and the laminator was only required to consolidate the laminate into the tight corners of the mould being manufactured. This represents a saving in manpower, and therefore reduces the cost and time to produce large moulds.

In certain embodiments, laminating unsaturated polyester and vinyl ester resin bases considered suitable by their manufacturers for use in open moulding applications may be suitable as base resins in the formulation of resins.

Certain embodiments, also finds utility in other processes and systems, for example in wetting glass reinforcement, in resin infusion processes, in closed moulding processes and vacuum infusion processes. This may be achieved since the surface tension modifier of certain embodiments minimizes the formation of air voids during the infusion and subsequent curing processes.

In certain embodiments, the relatively reduced amounts of the surface tension modifier may be used to substantially the same effect as a resin having a total predetermined concentration. For example, fibre-syntactic foam blends may be pre-treated with the surface tension modifier and the bulk resin left untreated. Alternatively, the fibres may have a coupling agent coating the fibres "infused" with the modifier. In these examples the fibre-syntactic foam blends themselves deliver the surface tension modifier and it leaches off the blend (or out of the coating to which it is infused) and into the resin adjacent the fibres to assist in wettability as described herein.

Process for assessing the compatibility of glass reinforcing fibre with the surface tension modified resin:

In some aspects, the glass roving may be chosen for its compatibility with the surface tension modified resin. In some embodiments the selection criteria steps comprise the following:

a. Chop 200 g of glass fibre (roving) using the roving cutter on the depositor.
b. Evenly distribute 15 to 20 g of the chopped roving over a flat mould surface to produce a circular mat about 200 mm in diameter. Catalyse 40 grams of surface tension modified resin and pour into the middle of the circular mat of chopped roving.
c. Allow the resin to spread out and wet the roving. When the composite has exothermed and cooled to room temperature, release the composite, which can then be held up to a bright light to compare its appearance with an "ideal" panel (i.e. one that is extensively hand consolidated). For example, a comparison can be made of the amount, size and position of air bubbles, and whether jackstrawing/spiderwebbing is present. Also, the diameter of the wetted glass laminate may be compared with that of an "ideal" panel. In some applications, the air bubbles (if present) should be few in number and only present in the outer-third of the panel. Typically, in the composite air bubbles with diameters of greater than 0.5 mm, 0.75 mm, 1 mm, 1.25 mm or 1.5 mm will be substantially lacking from the middle two-thirds of the panel.
d. If a glass fibre is found to have these properties a trial laminate can be sprayed onto a vertical mould surface with the depositor and the glass under test. When this laminate is fully cured it may then be removed from the mould and test samples can be cut there from and tested for the required physical and chemical properties. If the panel has acceptable mechanical properties then the glass fibre roving is suitable for use with a resin modified according to certain embodiments.

EXAMPLES

The following examples are to be considered in as illustrative and non-restrictive.

Example 1

Conventional Fibreglass Fabrication

Figure 3:
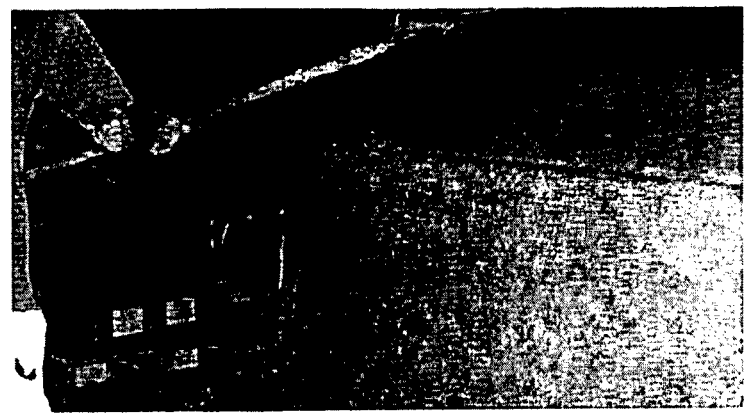
FIG. 3: illustrates manually consolidating laminate. The top layer illustrates a mechanically consolidated laminate wherein the air has been manually rolled out. The bottom layer illustrates an unconsolidated laminate using untreated resin, the lighter color indicates a large amount of air entrapment.

Referring to FIG. 3 it can be seen that the glass reinforcing fibre sprayed/deposited with resin onto an open mould resists "laying down" and wetting by the resin. It can also be seen that a significant quantity of air is entrained into the laminate. It is clear from this photographs that the laminate must be mechanically consolidated by rolling out the air and intimately mixing the glass and resin. The no roll structural laminate depicted in FIG. 4, according to certain embodiments, requires little or no mechanical consolidation, thereby reducing or eliminating the amount of walking on large machined substrate surfaces.

Example 2

Figure 4:
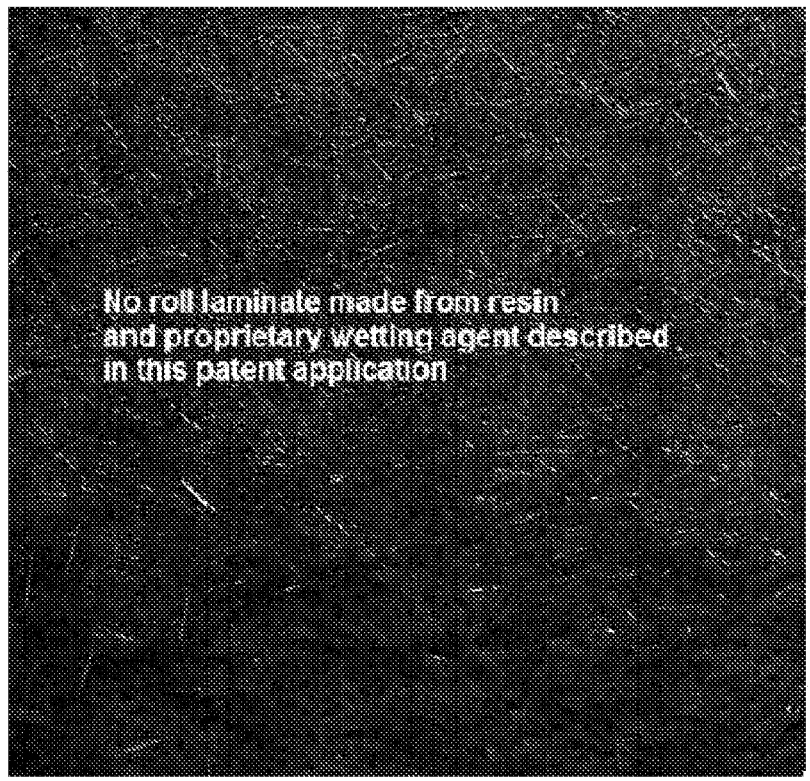
FIG. 4: illustrates non-consolidated laminates produced by certain embodiments disclosed herein. The No Roll/Minimum Roll Laminate illustrated in this figure was produced using selected glass fibres, and a resin modified with the wetting agent prepared according to certain embodiments. This exemplary laminate was applied with the same equipment used to deposit the laminate illustrated in FIG. 3. The laminate in FIG. 4 was not consolidated by mechanical or other means. The consolidation occurred by itself, unassisted.

Fibreglass Fabrication with the Surface Tension Modifier Incorporated in the Resin FIG. 4 shows a laminate made with a 1% addition of the surface tension modifier according to certain embodiments. In particular, an adduct prepared by reacting Dynasylan® Octeo with pentaerythritol. The laminate in FIG. 3 showing manual consolidation of the laminate was sprayed in the same way as that shown in FIG. 4.

Figure 5:
FIG. 5: illustrates a sectioned laminate deposited according to the procedures of certain embodiments disclosed herein. The layers that are illustrated in the composite include: (1) a foam substrate, (2) a sealer, (3) a structural layer, and (4) a syntactic foam moulding product.
Figure 6:
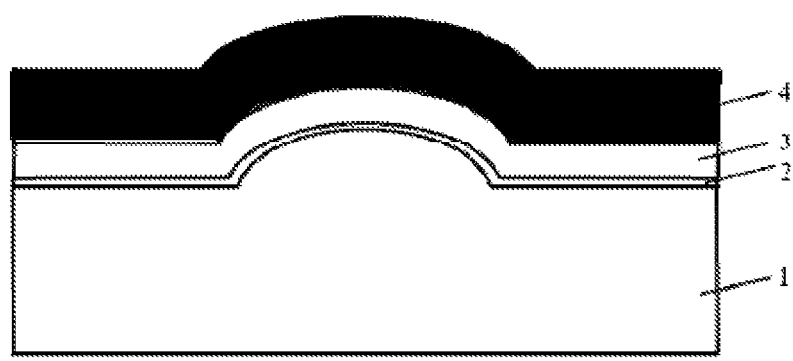
FIG. 6: shows in cross section a diagram highlighting the layers that together form the basis of the direct to mould system according to certain embodiments. The layers that are illustrated in the composite include: (1) a foam substrate, (2) a sealer, (3) a structural layer, and (4) a syntactic foam moulding product.
Figure 7:
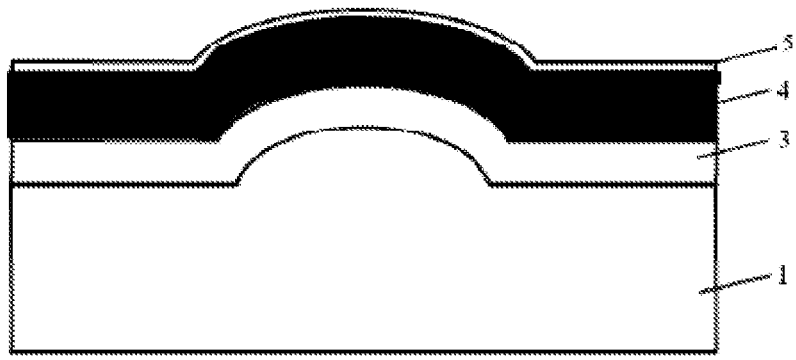
FIG. 7: shows in cross section a diagram highlighting the layers that together form the basis of the direct to mould system according to certain embodiments. The layers that are illustrated in the composite include: (1) a substrate, (3) a structural layer, (4) a syntactic foam moulding product, and (5) a tooling gel coat.
Figure 8:
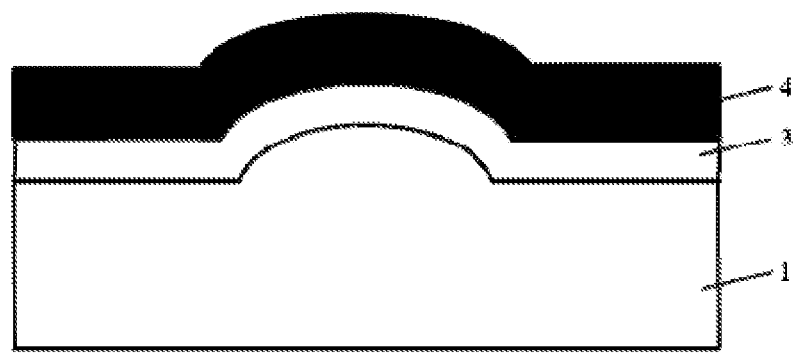
FIG. 8: shows in cross section a diagram highlighting the layers that together form the basis of the direct to mould system according to certain embodiments. The layers that are illustrated in the composite include: (1) a substrate, (3) a structural layer, and (4) a syntactic foam moulding product.

Comparing and FIG. 3 with FIG. 4 it is clear that a resin modified with the additive according to certain embodiments wets the reinforcing fibres significantly better than an unmodified resin. FIG. 5 further illustrates a sectioned laminate deposited according to the methods disclosed with respect to certain embodiments.

EXEMPLARY EXAMPLES

In the following, further embodiments are explained with the help of subsequent Exemplary Examples.

Exemplary Example 1

A method for producing a composite mould, comprising:
i) forming a substrate;
ii) applying a fibre reinforced structural laminate to the substrate, wherein said fibre reinforced structural laminate comprises: a) a first plurality of reinforcing fibres; and b) a first curable resin mixture, comprising a first curable resin and optionally a wetting agent;

iii) applying a syntactic foam moulding product to the fibre reinforced structural laminate, wherein said syntactic foam moulding product comprises: a) a plurality of treated reinforcing microfibres; b) a second curable resin mixture, comprising a second curable resin, thixatropes, and plastic spheres/hemispheres; and c) a coupling agent;

iv) optionally applying a tooling gel coat to the surface of said syntactic foam moulding product for the manufacture of moulds that require a high gloss surface finish; and v) curing said composite mould;

wherein:

i) optionally applying a foam sealer product to the substrate prior to applying the structural laminate, wherein the optional foam sealer product comprises: a) a plurality of treated reinforcing microfibres and/or Mica flakes; b) a foam sealer; and c) a coupling agent; and ii) the method of producing the composite mould is inclusive or exclusive of making and/or using a plug or composite plug.

Exemplary Example 2

A method for producing a composite mould, comprising:

i) forming a substrate;

ii) applying a fibre reinforced structural laminate to the substrate, wherein: a) the fibre reinforced structural laminate requires less mechanical consolidation during application to the surface of said substrate as compared with traditional plug or composite plug composite mould methods, or substantially no mechanical consolidation during application to the surface of said substrate; and b) said fibre reinforced structural laminate is prepared by contacting a first plurality of reinforcing fibres with a first curable resin mixture, wherein said first curable resin mixture comprises a first curable resin and optionally a predetermined quantity of a wetting agent;

iii) applying a syntactic foam moulding product to the fibre reinforced structural laminate to add rigidity and provide a durable, and machineable moulding surface for the production of composite parts to the surface of said fibre reinforced structural laminate, wherein said syntactic foam moulding product is prepared by combining: a) a plurality of treated reinforcing microfibres; b) a second curable resin mixture, comprising a second curable resin, thixatropes, and plastic spheres/hemispheres; and c) a predetermined quantity of coupling agent;

iv) optionally applying a tooling gel coat to the surface of said syntactic foam moulding product for the manufacture of moulds that require a high gloss surface finish; and v) curing said composite mould;

wherein:

i) optionally applying a foam sealer product to the substrate prior to applying the structural laminate, wherein the optional foam sealer product comprises: a) a plurality of treated reinforcing microfibres and/or Mica flakes; b) a foam sealer; and c) a coupling agent; and ii) the method of producing the composite mould is inclusive or exclusive of making and/or using a plug or composite plug.

Exemplary Example 3

The methods of Exemplary Examples 1 or 2, wherein the applied fibre reinforced structural laminate requires less mechanical consolidation during application to the surface of said substrate as compared with traditional plug, or composite plug, composite mould methods.

Exemplary Example 4

The methods of Exemplary Examples 1 or 2, wherein the applied fibre reinforced structural laminate requires substantially no mechanical consolidation during application to the surface of said substrate.

Exemplary Example 5

The methods of Exemplary Examples 1-3 or 4, wherein said syntactic foam moulding product adds rigidity and provides a durable, and machineable moulding surface for the production of composite parts.

Exemplary Example 6

The methods of Exemplary Examples 1-4 or 5, wherein said syntactic foam moulding product is sprayable and/or machineable.

Exemplary Example 7

The methods of Exemplary Examples 1-5 or 6, wherein said fibre reinforced structural laminate is further machined or touched up after being applied to the surface of said substrate.

Exemplary Example 8

The methods of Exemplary Examples 1-6 or 7, wherein said syntactic foam moulding product is further machined or touched up after being applied to the surface of said fibre reinforced structural laminate.

Exemplary Example 9

The methods of Exemplary Examples 1-7 or 8, wherein the time required to produce the composite mould is reduced by at least 30%, 40%, 50%, 60% or 70% as compared with as compared with traditional plug or composite plug composite mould methods.

Exemplary Example 10

The methods of Exemplary Examples 1-9 or 8, wherein the materials required to produce the composite mould is reduced by at least 30%, 40%, 50%, 60% or 70% as compared with as compared with traditional plug or composite plug composite mould methods.

Exemplary Example 11

The methods of Exemplary Examples 1-9 or 10, wherein the cost required to produce the composite mould is reduced by at least 30%, 40%, 50%, 60% or 70% as compared with as compared with traditional plug or composite plug composite mould methods.

Exemplary Example 12

The methods of Exemplary Examples 1-10 or 11, wherein the time required to produce the composite mould is reduced by at least 30%, 40%, 50%, 60% or 70% as compared with as compared with traditional plug or composite plug composite mould methods; and the materials required to produce the composite mould is reduced by at least 30%, 40%, 50%, 60% or 70% as compared with as compared with traditional plug or composite plug composite mould methods.

Exemplary Example 13

The methods of Exemplary Examples 1-11 or 12, wherein the substrate comprises:
- i) a structural substrate, comprising: a solid substrate; a wooden substrate; a plywood substrate; a particle board substrate; a MDF substrate; a composite material; a structural fibre board; a polymer concrete substrate; a concrete substrate; a fibreglass substrate; a polymer composite substrate; or a plastic composite substrate;
- ii) a non-structural substrate, comprising: a foam substrate; a plastic foam, meshing, or fabric; a sealed polystyrene foam substrate; a polyurethane foam substrate; or a rigid plastic foam substrate;
- iii) a machined substrate, a CNC machined substrate, a fabricated substrate, and/or a sealed substrate; and/or
- iv) combinations thereof.

Exemplary Example 14

The methods of Exemplary Examples 1-12 or 13, wherein the substrate comprises a machined substrate, a CNC machined substrate, a fabricated substrate, and/or a sealed substrate.

Exemplary Example 15

The methods of Exemplary Examples 1-13 or 14, wherein the substrate is sealed with a foam sealer product.

Exemplary Example 16

The methods of Exemplary Examples 1-14 or 15, wherein the foam sealer comprises:
- i) a sprayable/rollable water based sealer formulated from polyvinyl alcohol;
- ii) a sealer made from a low viscosity sprayable/rollable epoxy compound that when cured allows unsaturated polyester or vinyl ester resins to adhere to its surface; or
- iii) a specially formulated vinyl functional resin that does not attack the polystyrene foam surface such as CCP Styroguard or equivalent.

Exemplary Example 17

The methods of Exemplary Examples 1-15 or 16, wherein the substrate is sealed with a polystyrene foam sealer.

Exemplary Example 18

The methods of Exemplary Examples 1-16 or 17, wherein the method of producing the structural laminate, comprises:
- i) combining the first curable resin with the optional wetting agent to form the first curable resin mixture;
- ii) contacting the first plurality of reinforcing fibres with the first curable resin mixture; and
- ii) curing said first curable resin mixture.

Exemplary Example 19

The methods of Exemplary Examples 1-17 or 18, wherein the structural laminate is applied to a structural substrate.

Exemplary Example 20

The methods of Exemplary Examples 1-18 or 19, wherein the structural laminate is applied to a non-structural substrate.

Exemplary Example 21

The methods of Exemplary Examples 1-19 or 20, wherein the structural laminate is applied to a structural substrate, and wherein the applied structural laminate has a thickness equal to or greater than 3 mm, 4 mm, 5 mm, 6 mm, or 7 mm.

Exemplary Example 22

The methods of Exemplary Examples 1-20 or 21, wherein the structural laminate is applied to a non-structural substrate, and wherein the applied structural laminate has a thickness equal to or greater than 5 mm, 6 mm, 7 mm, 8 mm, 9 mm, or 10 mm.

Exemplary Example 23

The methods of Exemplary Examples 1-21 or 22, wherein the wetting agent minimizes the formation of air voids during said curing.

Exemplary Example 24

The methods of Exemplary Examples 1-22 or 23, wherein the surface tension modifier minimizes the formation of air voids during said curing.

Exemplary Example 25

The methods of Exemplary Examples 1-23 or 24, wherein the amount of the wetting agent comprises 1-20%, with respect to the amount of the first curable resin.

Exemplary Example 26

The methods of Exemplary Examples 1-24 or 25, wherein the amount of the surface tension modifier comprises 1-20%, with respect to the amount of the second curable resin.

Exemplary Example 27

The methods of Exemplary Examples 1-25 or 26, wherein the amount of the wetting agent comprises an amount to lower the surface tension of the curable resin to <20% and/or substantially wet out and penetrate the reinforcing fibres.

Exemplary Example 28

The methods of Exemplary Examples 1-26 or 27, wherein the amount of the surface tension modifier comprises an amount to lower the surface tension of the curable resin to <20% and/or substantially wet out and penetrate the reinforcing fibres.

Exemplary Example 29

The methods of Exemplary Examples 1-27 or 28, wherein the plurality of treated reinforcing microfibres comprise:

i) mineral fibres, comprising wollastonite and/or Mica;
ii) glass fibres, comprising E-, S-, or C-class glass;
iii) aramid fibres;
iv) ceramic fibres;
v) cellulose fibres; and/or
vi) carbon fibres.

Exemplary Example 30

The methods of Exemplary Examples 1-28 or 29, wherein the plurality of treated reinforcing microfibres are coated with a coupling agent.

Exemplary Example 31

The methods of Exemplary Examples 1-29 or 30, wherein the coupling agent comprises a plurality of molecules, each having:
i) a first end adapted to bond to a fibre of the plurality of reinforcing fibres; and
ii) a second end adapted to bond to the resin when cured.

Exemplary Example 32

The methods of Exemplary Examples 1-30 or 31, wherein the coupling agent comprises: Dow® Z-6030; Z-6032; or Z-6075.

Exemplary Example 33

The methods of Exemplary Examples 1-31 or 32, wherein the coupling agent is present in an amount of 1-10%, with respect to the amount of the plurality of treated reinforcing microfibres.

Exemplary Example 34

The methods of Exemplary Examples 1-32 or 33, wherein the coupling agent is present in an amount of 1-10%, with respect to the amount of the plurality of treated reinforcing microfibres.

Exemplary Example 34

The methods of Exemplary Examples 1-32 or 33, wherein method for producing a fibre reinforced composite material, comprises:
i) mixing the first plurality of reinforcing fibres with the first curable resin mixture; and
ii) curing said first curable resin mixture;
wherein said first curable resin mixture comprises the first curable resin and a predetermined quantity of surface tension modifier prepared by reacting a polyol with an organo-functional silane.

Exemplary Example 35

The methods of Exemplary Examples 1-33 or 34, wherein method for producing a composite material, comprises:
i) combining the plurality of treated reinforcing microfibres and the second curable resin mixture to form a composition;
ii) applying said composition to the structural laminate; and
iii) curing;
wherein said second curable resin mixture comprises the second curable resin and a predetermined quantity of the coupling agent.

Exemplary Example 36

The methods of Exemplary Examples 1-34 or 35, wherein the first and/or second curable resin comprises a liquid curable resin.

Exemplary Example 37

The methods of Exemplary Examples 1-35 or 36, wherein the first plurality of reinforcing fibres comprise an average length of between about 5 mm and 20 mm for the structural layer.

Exemplary Example 38

The methods of Exemplary Examples 1-36 or 37, wherein the plurality of treated reinforcing microfibres comprise an average length of between 0.1 mm and 0.7 mm for the syntactic foam laminates.

Exemplary Example 39

The methods of Exemplary Examples 1-37 or 38, wherein the said first and/or second curable resin comprises an unsaturated polyester resin; a vinyl ester resin; or a blend of unsaturated polyester and vinyl ester resins.

Exemplary Example 40

The methods of Exemplary Examples 1-38 or 39, wherein said first or second curable resin comprises: Derakane epoxy vinyl ester resin 411-350 or equivalent; Vipel epoxy vinyl ester resin or equivalent; or Epovia epoxy vinyl ester resin RF1001 or equivalent.

Exemplary Example 41

The methods of Exemplary Examples 1-39 or 40, wherein said unsaturated polyester resin is an epoxy vinyl ester resin Derakane 411-350 or equivalent.

Exemplary Example 42

The methods of Exemplary Examples 1-40 or 41, wherein said wetting agent and/or surface tension modifier is prepared by reacting the polyol with the organo-functional silane.

Exemplary Example 43

The methods of Exemplary Examples 1-41 or 42, wherein said coupling agent is combined with said second curable resin in an amount in the range of between about 0.5% to about 5% w/w.

Exemplary Example 44

The methods of Exemplary Examples 1-42 or 43, wherein said polyol comprises trimetholylpropane or pentaerythritol.

Exemplary Example 45

The methods of Exemplary Examples 1-43 or 44, wherein said organo-functional silane is a trialkoxysilane $(RSi(OR')_3)$.

Exemplary Example 46

The methods of Exemplary Examples 1-44 or 45, wherein said trialkoxysilane comprises: Dynasylan® OCTEO; DOW® Z6341; Dynasylan® GLYMO; DOW® Z6040; Dynasylan® IBTEO; DOW® Z2306; Dynasylan® AMEO; DOW® Z6020; Dynasylan® MEMO; DOW® Z6030; DOW® Z6032; DOW® Z6172; DOW® Z6300; DOW® Z6011; Dynasylan 9116; DOW® Z6075; or other vinyl, epoxy, amine or alkyl function silanes.

Exemplary Example 47

The methods of Exemplary Examples 1-45 or 46, wherein said surface tension modifier is prepared in the presence of heat and a catalyst.

Exemplary Example 48

The methods of Exemplary Examples 1-46 or 47, wherein said catalyst is an organo tin-based catalyst.

Exemplary Example 49

The methods of Exemplary Examples 1-47 or 48, wherein the method further includes the addition of at least one reactive diluent and/or thixatropic agent.

Exemplary Example 50

The methods of Exemplary Examples 1-48 or 49, wherein said thixatropic agent comprises: silica; precipitated silica; fine wollastonite fibres as found in Nyglos 8; hydrogenated caster oils; amide thixatropes; or combinations thereof.

Exemplary Example 51

The methods of Exemplary Examples 1-49 or 50, wherein said reactive diluent comprises: ethyl acrylate; butyl acrylate; HEMA; IBMA; MMA; isobornyl methacrylate; styrene; or derivatives thereof.

Exemplary Example 52

The methods of Exemplary Examples 1-50 or 51, wherein said reactive diluent is added to said first and/or second curable resin in an amount in the range of between about 5% to about 30%.

Exemplary Example 53

The methods of Exemplary Examples 1-51 or 52, wherein the treated reinforced microfibre syntactic foam composite material is prepared from surface treated glass and/or mineral fibres and a liquid curable resin blend.

Exemplary Example 54

The methods of Exemplary Examples 1-52 or 53, wherein the second curable resin mixture further comprise a quantity of treated reinforcing glass microfibres, wherein the microfibres comprise a mean fibre length of less than 1 mm.

Exemplary Example 55

The methods of Exemplary Examples 1-53 or 54, wherein the plurality of treated reinforcing microfibres comprise a mean length in the range of between about 0.03 mm to about 0.7 mm.

Exemplary Example 56

The methods of Exemplary Examples 1-54 or 55, wherein the plurality of treated reinforcing microfibres are added to the second curable resin mixture in an amount of about 10% w/w, 12% w/w, or 14% w/w.

Exemplary Example 57

The methods of Exemplary Examples 1-55 or 56, wherein the sprayable syntactic foam moulding product is formed by further adding syntactic microspheres in an amount of about 10% v/v, 15% v/v, 20% v/v, 25% v/v, 30% v/v, 35% v/v to the second curable resin mixture.

Exemplary Example 58

The methods of Exemplary Examples 1-56 or 57, wherein the surface tension modified resin comprises a contact angle of less than about 30° when said fibres are in contact with said second curable resin.

Exemplary Example 59

The methods of Exemplary Examples 1-57 or 58, wherein the syntactic foam moulding product comprises fly ash, cenospheres, glass micro balloons, plastic micro balloons, ceramic micro balloons.

Exemplary Example 60

The methods of Exemplary Examples 1-58 or 59, wherein the syntactic foam beads comprise fly ash; cenospheres; glass micro balloons; plastic micro balloons; or ceramic micro balloons.

Exemplary Example 61

The methods of Exemplary Examples 1-59 or 60, wherein the first curable resin is modified with an amount in the range of between about 1% to about 5% of a wetting agent.

Exemplary Example 62

The methods of Exemplary Examples 1-60 or 61, wherein the second curable resin is combined with the coupling agent in the an amount in the range of between about 1% to about 5%.

Exemplary Example 63

The methods of Exemplary Examples 1-61 or 62, wherein the modified first and/or second curable resin increases and/or improves the wettability of the said curable resin, as compared to an unmodified curable resin.

Exemplary Example 64

The methods of Exemplary Examples 1-62 or 63, wherein the modified first and/or second curable resin increases and/or improves the wettability of the first and/or second plurality of reinforcing fibres, as compared to an unmodified curable resin.

Exemplary Example 65

The methods of Exemplary Examples 1-63 or 64, wherein the modified first and/or second curable resin comprises a surface tension or contact angle of at least 10-20% lower than an unmodified first and/or second curable resin.

Exemplary Example 66

The methods of Exemplary Examples 1-64 or 65, wherein the increased and/or improved wettability of the modified first and/or second curable resin lowers the surface tension or contact angle of the first and/or second curable resin by at least 10-20% lower than the unmodified first and/or second curable resin.

Exemplary Example 67

The methods of Exemplary Examples 1-65 or 66, wherein the modified first and/or second curable resin is capable of wicking up a strand of fiberglass by at least 0.5 mm.

Exemplary Example 68

The methods of Exemplary Examples 1-66 or 67, wherein a structural laminate comprising the first plurality of reinforced fibres, when immersed in the modified first curable resin, shows little or no debonding or jackstrawing after curing the laminate, as compared to unmodified first curable resin.

Exemplary Example 69

The methods of Exemplary Examples 1-67 or 68, wherein the wettability of the first and/or second curable resin is further increased and/or improved by adding a reactive diluent to the first and/or second curable resin.

Exemplary Example 70

The methods of Exemplary Examples 1-68 or 69, wherein the wettability of the first plurality of reinforcing fibres is further increased and/or improved by adding a reactive diluent to the first and/or second curable resin.

Exemplary Example 71

The methods of Exemplary Examples 1-69 or 70, wherein the foam sealer comprises:
  i) a sprayable/rollable water based sealer formulated from polyvinyl alcohol;
  ii) a sealer made from a low viscosity sprayable/rollable epoxy compound; or
  iii) a vinyl functional resin that does not attack the polystyrene foam surface.

Exemplary Example 72

The methods of Exemplary Examples 1-70 or 71, wherein the foam sealer, made from the low viscosity sprayable/rollable epoxy compound, allows unsaturated polyester or vinyl ester resins to adhere to its surface when cured.

Exemplary Example 73

The methods of Exemplary Examples 1-71 or 72, wherein the method is a direct-to-mould method.

Exemplary Example 74

A moulded composite capable of producing 20 to 1000 parts, wherein the moulded composited is manufactured according to a method of any of Exemplary Examples 1 to 72 or 73.

Exemplary Example 75

A moulded composite capable of producing 15 to 1500, 30 to 100, 20 to 50, 100 to 500, 200 to 1000 300 to 800, 400 to 1000 or 500 to 1000 parts, wherein the moulded composited is manufactured according to a method of any of Exemplary Examples 1 to 73 or 74.

Exemplary Example 76

A moulded composite according to Exemplary Examples 74 or 75 that is capable of producing parts, without the need to retouch the moulded composited wherein the moulded composite is manufactured according to a method of any of Exemplary Examples 1 to 72 or 73.

Exemplary Example 77

A moulded composite according to Exemplary Examples 74-75 or 76 that is capable of producing parts, with retouching of the moulded composited wherein the moulded composite is manufactured according to a method of any of Exemplary Examples 1 to 72 or 73.

Exemplary Example 78

A syntactic foam moulding product, comprising:
  i) a plurality of treated reinforcing microfibres;
  ii) a curable resin mixture, comprising a curable resin, optionally thixatropes, and plastic spheres/hemispheres; and
  iii) a coupling agent.

Exemplary Example 79

The syntactic foam moulding product of Example 78, wherein the plurality of treated reinforcing microfibres comprise microfibres having an average fibre diameter in the range of between 5-15 microns.

Exemplary Example 80

The syntactic foam moulding product of Exemplary Examples 78 or 79, wherein the plurality of treated reinforcing microfibres comprise microfibres having a mean fibre length in the range of between 250-800 microns.

Exemplary Example 81

The syntactic foam moulding product of Exemplary Examples 78-79 or 80, wherein the plurality of treated reinforcing microfibres comprise microfibres having an aspect ratio of the fibre length to the fibre diameter in the range of between 50:1 to 10:1.

Exemplary Example 82

The syntactic foam moulding product of Exemplary Examples 78-80 or 81, wherein the plurality of treated reinforcing microfibres comprise mineral fibres and/or glass fibres, comprising E-, S- or C-class glass.

Exemplary Example 83

The syntactic foam moulding product of Exemplary Examples 78-81 or 82, wherein the plurality of treated reinforcing microfibres have been treated, coated and/or modified with a coupling agent such that the properties of an interphase is substantially equivalent to those of the bulk cured resin, wherein the cured resin adjacent to said reinforcing microfibres defines an interphase.

Exemplary Example 84

The syntactic foam moulding product of Exemplary Examples 78-82 or 83, wherein the coupling agent comprises a plurality of molecules, each having a first end adapted to bond to the glass fibre and a second end adapted to bond to the resin when cured.

What is claimed is:

1. A method for producing a composite mould, comprising:
   i) forming a substrate;
   ii) applying a fibre reinforced structural laminate to the substrate, wherein said fibre reinforced structural laminate comprises:
      a) a first plurality of reinforcing fibres; and
      b) a first curable resin mixture, comprising a first curable resin and a wetting agent, wherein the wetting agent is prepared by reacting a polyol with an organo-functional silane;
   iii) applying a syntactic foam moulding product to the fibre reinforced structural laminate, wherein said syntactic foam moulding product comprises:
      a) a plurality of treated reinforcing microfibres;
      b) a second curable resin mixture, comprising a second curable resin, and optionally thixatropes and plastic spheres/hemispheres; and
      c) a coupling agent, wherein the coupling agent is prepared by reacting a polyol with an organo-functional silane;
   iv) optionally applying a tooling gel coat to the surface of said syntactic foam moulding product for the manufacture of moulds that require a high gloss surface finish; and
   v) curing said composite mould.

2. The method of claim 1, wherein said syntactic foam moulding product adds rigidity to the produced composite mould.

3. The method of claim 1, wherein said syntactic foam moulding product is sprayable and/or machineable.

4. The method of claim 1, wherein the substrate comprises:
   i) a structural substrate, comprising: a solid substrate; a wooden substrate; a plywood substrate; a particle board substrate; a MDF substrate; a composite material; a structural fibre board; a polymer concrete substrate; a concrete substrate; a fibreglass substrate; a polymer composite substrate; or a plastic composite substrate;
   ii) a non-structural substrate, comprising: a foam substrate; a plastic foam, meshing, or fabric; a sealed polystyrene foam substrate; a polyurethane foam substrate; or a rigid plastic foam substrate;
   iii) a machined substrate, a CNC machined substrate, a fabricated substrate, and/or a sealed substrate; and/or
   iv) combinations thereof.

5. The method of claim 1, wherein the substrate is sealed with a foam sealer product.

6. The method of claim 1, wherein the foam sealer comprises:
   i) a sprayable and/or rollable water based sealer formulated from polyvinyl alcohol;
   ii) a sealer made from a low viscosity sprayable and/or rollable epoxy compound that when cured allows unsaturated polyester or vinyl ester resins to adhere to its surface; or
   iii) a specially formulated vinyl functional resin that does not attack a polystyrene foam surface.

7. The method of claim 1, wherein the plurality of treated reinforcing microfibres comprise:
   i) mineral fibres, comprising wollastonite and/or Mica;
   ii) glass fibres, comprising E-, S-, or C-class glass;
   iii) aramid fibres;
   iv) ceramic fibres;
   v) cellulose fibres; and/or
   vi) carbon fibres.

8. The method of claim 1, wherein the plurality of treated reinforcing microfibres are coated with a coupling agent.

9. The method of claim 1, wherein the coupling agent comprises a plurality of molecules, each having:
   i) a first end adapted to bond to a fibre of the plurality of reinforcing fibres; and
   ii) a second end adapted to bond to the resin when cured.

10. The method of claim 1, wherein the first and/or second curable resin comprises a liquid curable resin.

11. The method of claim 1, wherein the first plurality of reinforcing fibres comprise an average length of between about 5 mm and 20 mm for the structural layer.

12. The method of claim 1, wherein the said first and/or second curable resin comprises an unsaturated polyester resin; a vinyl ester resin; or a blend of unsaturated polyester and vinyl ester resins.

13. The method of claim 1, wherein the polyol reacted to prepare said wetting agent comprises trimetholylpropane or pentaerythritol.

14. The method of claim 1, wherein the method further comprises applying a foam sealer product to the substrate prior to applying the structural laminate.

15. The method of claim 1, wherein the foam sealer product comprises:
   a) a plurality of treated reinforcing microfibres and/or Mica flakes;
   b) a foam sealer; and
   c) a coupling agent.

16. The method of claim 1, wherein the method is inclusive of making and/or using a plug or composite plug.

17. The method of claim 1, wherein the method is exclusive of making and/or using a plug or composite plug.

18. The method of claim 1, wherein said syntactic foam moulding product provides a durable and machineable moulding surface to the produced composite mould.

19. The method of claim 6, wherein the polystyrene foam surface is CCP Styroguard.

20. The method of claim 1, wherein the polyol reacted to prepare said coupling agent comprises trimetholylpropane or pentaerythritol.

* * * * *